United States Patent [19]
Wood

[11] Patent Number: 5,515,502
[45] Date of Patent: May 7, 1996

[54] DATA BACKUP SYSTEM WITH METHODS FOR STRIPE AFFINITY BACKUP TO MULTIPLE ARCHIVE DEVICES

[75] Inventor: Timothy E. Wood, San Francisco, Calif.

[73] Assignee: Sybase, Inc., Emeryville, Calif.

[21] Appl. No.: 129,942

[22] Filed: Sep. 30, 1993

[51] Int. Cl.$^6$ ........................................ G06F 17/30
[52] U.S. Cl. ................. 395/182.13; 395/600; 364/282.1
[58] Field of Search ................................ 395/600, 575, 395/182.13, 182.14; 360/72.2; 364/282.1

[56] References Cited

U.S. PATENT DOCUMENTS

| | | | |
|---|---|---|---|
| 4,621,359 | 11/1986 | McMillen | 370/60 |
| 4,686,620 | 7/1987 | Ng | 364/200 |
| 4,920,487 | 4/1990 | Baffes | 364/300 |
| 5,043,871 | 8/1991 | Nishigaki et al. | 364/200 |
| 5,283,897 | 2/1994 | Georgiadis et al. | 395/650 |
| 5,446,884 | 8/1995 | Schwendemann | 395/600 |

OTHER PUBLICATIONS

Backup/Load Benchmark Report Using Sun Microsystems SPARCserver 1000E, and Sybase SQL Server 10.0.1 Backup Server, Authored by Sun Microsystems, 1994.

Oracle RDBMS Database Administrators Guide (version 6.0), Chapters 3, 8, 9, 15. Oct. 1990.

Acer's Altos Laucnhes Mid–Range Unix Box, Slashes Prices, Computergram International, Dec. 6, 1990.

Fernandez, Summers & Wood, Database Security and Integrity (1981) p. 137.

Teorey, Toby J., Pinkerton, Tad B., "A Comparative Analysis of Disk Scheduling Policies", Communications of the ACM, vol. 15, No. 3, pp. 177–184, Mar. 1972.

Khoury, Naim A., "Looking Forward to Better Archiving", Database Programming & Design, pp. 33–39, Jun. 1991.

Reed, David P.; and Kanodia, Rajendra, K., "Synchronization with Eventcounts and Sequencers", Communications of the ACM, vol. 22, No. 2, pp. 115–123, Feb. 1979.

Press Release, "DataTools Announces SQL–Backtrack Net-Worker Module, Automated Sybase SQL Server Backup for Legato NetWorker," dated Mar. 4, 1993.

Press Release, "DataTools Announces SQL–Backtrack for Sybase, The Complete Database Backup and Recovery Tool", dated Dec. 21, 1992.

"Corporate Background" of DataTools, Inc., Dec. 1992.

Primary Examiner—Robert W. Beausoliel, Jr.
Assistant Examiner—Alan M. Fisch
Attorney, Agent, or Firm—John A. Smart

[57] ABSTRACT

A data backup system implements coordination between a Database Server and a Backup Server to produce a recoverable database dump. By utilizing a technique referred to as stripe affinity, a mechanism is disclosed for ensuring the integrity of a database backup made to multiple archive devices simultaneously. In addition, by utilizing stripe affinity, archived data may be reloaded from fewer archive devices than were used to make the original backup. A task scheduler mechanism allocates processor time among the tasks that comprise the backup system. In this way the I/O service tasks can process their event queues while the current set of allocation pages are also being processed.

17 Claims, 9 Drawing Sheets

*DUMP SYNCHRONIZATION SEQUENCE*

| SQL SERVER | BACKUP SERVER |
|---|---|
| PHASE 1: | |
|     PROHIBIT NEW DUMPS. (20) | |
|     RECORD DUMP STARTRID. (22) | |
|     SEND RPC("START DUMP") (24) ⟶ | BEGIN DUMPING |
|     TRANSACTIONS PROCEED; BUILD (28) FLUSH LIST .... | ... DUMP I/O ... (26) |
| PHASE 2: ⟵ | RETURN("PHASE 1 DONE") (30) |
|     BLOCK APPENDS TO FLUSH LIST; (32) MARK END OF FLUSH LIST. | AWAIT PHASE 2 RPC. |
|     SEND RPC("PHASE 2", FLUSH_LIST...) (34) ⟶ | DUMP PAGES IN FLUSH LIST. |
|     ... TASKS PROCEED EXCEPT APPENDERS TO FLUSH LIST... | ... DUMP I/O ... (36) |
| PHASE 3: ⟵ | RETURN("PHASE 2 DONE") (38) |
|     SAMPLE DUMP INSTANT. (40) | AWAIT PHASE 3 RPC. |
|     FLUSH THE LOG. | |
|     DEACTIVATE FLUSH LIST AND AWAKEN APPENDERS. | |
|     SEND RPC("PHASE 3") (46) ⟶ | DUMP PAGES IN LOG. |
|     ... TRANSACTIONS ... | ... DUMP I/O ... |
|     SAVE DUMP INSTANT IN DUMP TRAILER. ⟵ | RETURN("PHASE 3 DONE") |
|     SEND RPC("WRITE DUMP TRAILER") ⟶ | WRITE DUMP TRAILER TO ARCHIVE. |
|     PERMIT NEW DUMPS. ⟵ | RETURN("TRAILER WRITTEN") (50) |

*FIG. 2*

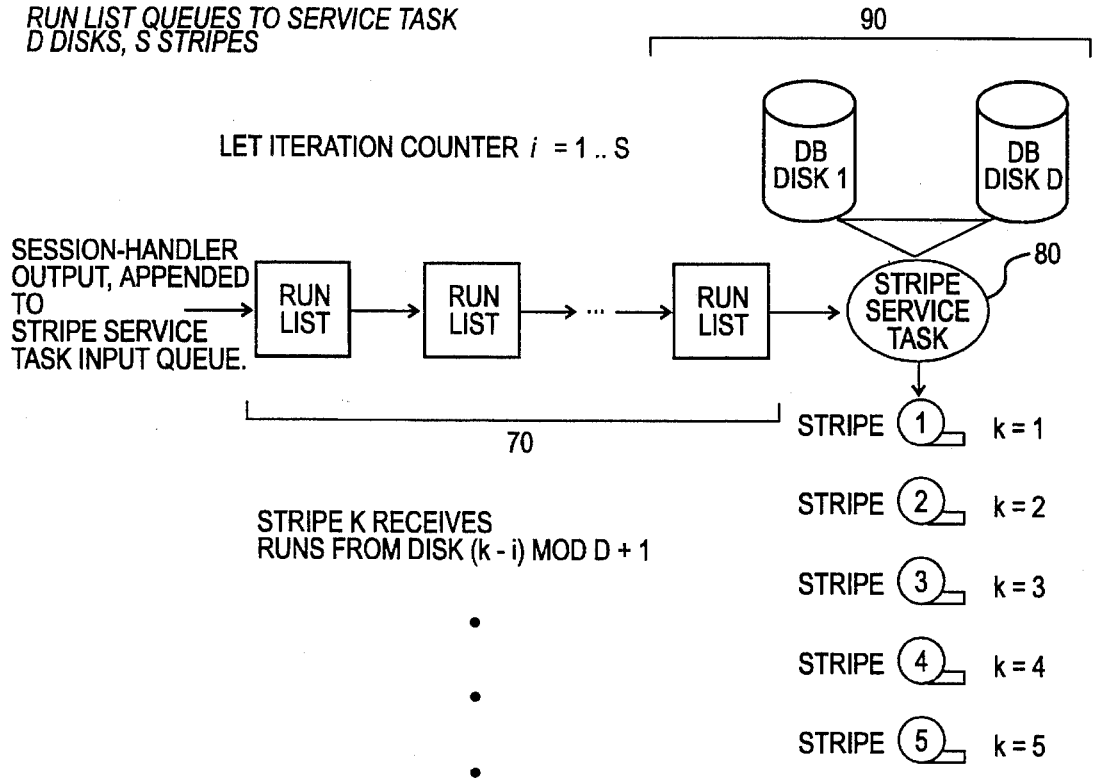
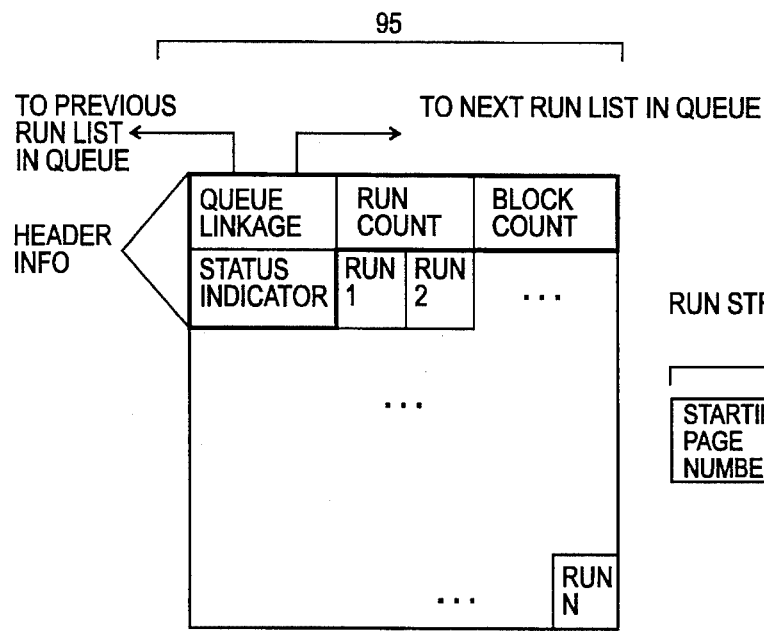
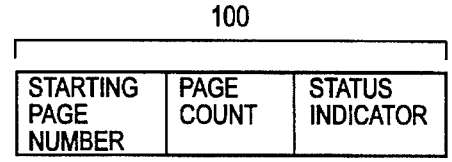
FIG. 3B

DATA BACKUP SYSTEM WITH METHODS FOR STRIPE AFFINITY BACKUP TO MULTIPLE ARCHIVE DEVICES

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

This invention relates, in general, to the field of computer data backup devices and, more particularly, to an improved computer data backup system which is particularly suited to the backup of data stored in computer systems which are used in the processing of large transactional databases and transactional file systems.

BACKGROUND OF THE INVENTION

In the computer industry it has long been recognized that data stored within a computer system's mass storage substructure, such as a hard disk drive, should be "backed up", where a copy of the data is made on a regular basis, in order to prevent the loss of that data should the computer system malfunction or "crash" or otherwise become inoperative or unavailable. Early in the field of database systems, data files were stored on magnetic hard disks, providing relatively fast random access, and were then regularly backed up to magnetic tapes, a medium which provides slower sequential access but which can be used to store data densely and inexpensively. These removable magnetic tapes permit archived data to be moved to another location for safekeeping or for later loading to a different computer system.

Traditionally such backups have been performed on a regularly scheduled basis with separate archives being created monthly, weekly, daily or even hourly. However, the timing of such backups has had to be coordinated with the actual usage of the computer system being backed up, since frequently a backup cannot be performed at the same time that the computer system is also being used for data processing.

When computer database programs were designed for operating primarily in a batch processing mode, on a large mainframe computer, such backups were readily scheduled and easily performed since users did not enjoy an interactive involvement with the computer system. However, with the development of time sharing systems and other "transactional" data base systems, including those found on personal computers, users now expect to interact with computer systems "on-line" and in real time, creating procedural difficulties for the process of backing up data. These difficulties result from the fact that in order to back up a data base or other information stored in a computer system, and especially when the data to be backed up is of a transactional nature, data must be frozen at some point in time just prior to performing the backup in order to maintain the integrity of the database and eliminate the possibility of losing data which may change during backup.

The simplest way to accomplish this task is to prevent access to the database while it is being backed up. However, such a technique results in a disadvantage to the user in that the user is unable to access the database while it is being backed up, effectively taking the database "off line" and creating an inconvenience leading to inefficiency. Such a technique may also create problems regarding data integrity when, for example, a transaction is in progress but has not yet been committed to the database when a backup begins.

Another problem identified in the prior art is the fact that in traditional backup systems a database, parts of which may be located on multiple disk drives, is frequently backed up to a single backup device usually comprising a single backup tape or other storage medium. Such an architecture, while keeping the cost of media and equipment required to perform a backup low, also results in decreased productivity and increased inefficiency. Using such a system, only one hard disk drive containing data can be backed up to a tape drive at a time, requiring other hard disk drives to wait before dumping their data to the backup device.

One possible solution to the above noted inefficiency is to utilize a backup system which incorporates multiple archive devices. However, a new problem is introduced relating to the restoration of archived data when the architecture or configuration of the machine to which the data is to be restored does not match the architecture or configuration of the machine from which the data was originally obtained. This problem occurs when reloading data, previously backed up onto multiple archive devices, to a different computer (possibly located at a different site) which has a different configuration of archive devices and mass storage devices. For example, consider a backup set which may have been recorded across 8 tape drives and which must be restored to a computer system with only 2 tape drives. In such a situation, under the prior art, a significant effort on the part of the system operator will be required to coordinate the mounting and loading of data from the backup tape set to the secondary computer system. In this example it is necessary to make sure that data which is being loaded from one tape does not overwrite data which has previously been loaded from an earlier tape, unless such later loaded data was also created or modified later in time. Under such a system, restoring a backed-up database to a different computer, requires constant intervention on the part of a human operator carefully checking logs of the contents of each backup tape to make sure that the full recorded image of the database taken at backup time is restored correctly. Therefore, while in practice such backups are possible, and may be necessary to conduct business in an emergency situation, they may not be conducted as often as optimally required due to the amount of effort necessary to perform such a restoration.

Therefore, it has been determined that the need exists for an improved data backup system which overcomes the limitations noted above in the prior art, by permitting data to be backed up from a transactional database to multiple archive devices, simultaneously, without the need to lock out all access to the database during backup. It has been determined further that the need exists to permit the restoration of archived data to a secondary computer system where the data is restored from fewer archive devices than were used for backup recording purposes. Such a system would ensure that data which is loaded from an archive device to a secondary database always loads the oldest information first and the most current information last in order to prevent obsolete data from overwriting fresh data.

Accordingly, an improved data backup system is provided which accomplishes the aforenoted goals resulting in increased system performance, along with ease and convenience of use, while preserving the integrity of backed up data.

SUMMARY OF THE INVENTION

The invention is directed to an improved data backup system for use in backing up and restoring database or other computer data. The invention provides a framework-for correcting problems associated with saving and loading data such as poor performance and inconvenient use, the potential for inaccurate restorations, and the requirement that hardware configuration for backup and restoration be substantially similar.

The improved data backup system also provides for the implementation of an unattended backup program, whereby free space on database disks is tracked and data automatically backed up when the free space falls below a predefined threshold. The improved data backup system may be further enhanced to sense the storage characteristics of backup devices automatically (speed, density, availability), and supports writing multiple backups to the same backup volume, supports dump striping (that is, the interleaving of dumped data across several volumes) and further supports the dumping and loading of data from archive devices located elsewhere in a network.

As such, the method disclosed by the invention provides for a database, an archive device and a mechanism for controlling the transfer of data from the database to the archive device in a manner which ensures that data is transferred in a time sequence order so that data created or modified earlier in time is always transferred before the same data modified later in time, both during backup and during restoration. To accomplish these tasks the invention further comprises the elements of (1) maintenance of stripe directories to track the storage of data within archive devices, (2) compression of stripe directories to reduce the need for system resources, especially when managing large transactional databases; and (3) the ability to restore from fewer devices than used to back up.

In a preferred embodiment, the dump striping capability of the invention allows N archive devices to be used in parallel to create an N-way simultaneous striped dump. This means that a database to be archived may be split logically into N roughly equal size portions of data and that these portions will then be saved concurrently to N archive devices. Such an architecture is advantageous in that it reduces dump time by a factor proportional to N and may obviate the need to change volumes during a backup since the N archive devices may have enough capacity to hold their corresponding pieces of the database on a single volume.

Accordingly, it is an object of the invention to provide an improved data backup system which permits the backup of a transactional database without requiring the database system to be taken off line by keeping track of transactions which are started or already underway but not completed when a backup has begun. It is another object of the invention to provide an improved data backup system in which data may be backed up to multiple archive devices simultaneously in order to decrease the time necessary to perform a backup. It is an additional object of the invention to provide an improved data backup system in which the allocation of data saved to multiple data backup devices is made through the use of a stripe affinity algorithm ensuring the integrity of the data during restoration. It is a further object of the invention to provide an improved data backup system employing stripe affinity which further permits reloading archived data from fewer devices than were used to originally perform the backup. It is yet a further object of the invention to provide an improved data backup system which maximizes database I/O concurrency and throughput. Still other objects and advantages of the invention will, in part, be obvious and will, in part, be apparent from the specification.

The invention accordingly comprises the features of construction, combinations of elements and arrangements of parts which will be exemplified in the detailed descriptions hereinafter set forth, while the scope of the invention will be indicated in the claims.

BRIEF DESCRIPTION OF THE DRAWINGS

For a fuller understanding of the invention, reference is made to the following descriptions, taken in connection with the accompanying drawings in which:

FIG. 2 is a chart listing a set of suitable backup phases performed in accordance with the instant invention;

FIG. 3b is an illustration showing the interface between the Session Handler and the Service Tasks;

FIG. 3c is an illustration showing the assignment of extents to run lists depicted in FIG. 3a;

GLOSSARY

Figure 1:
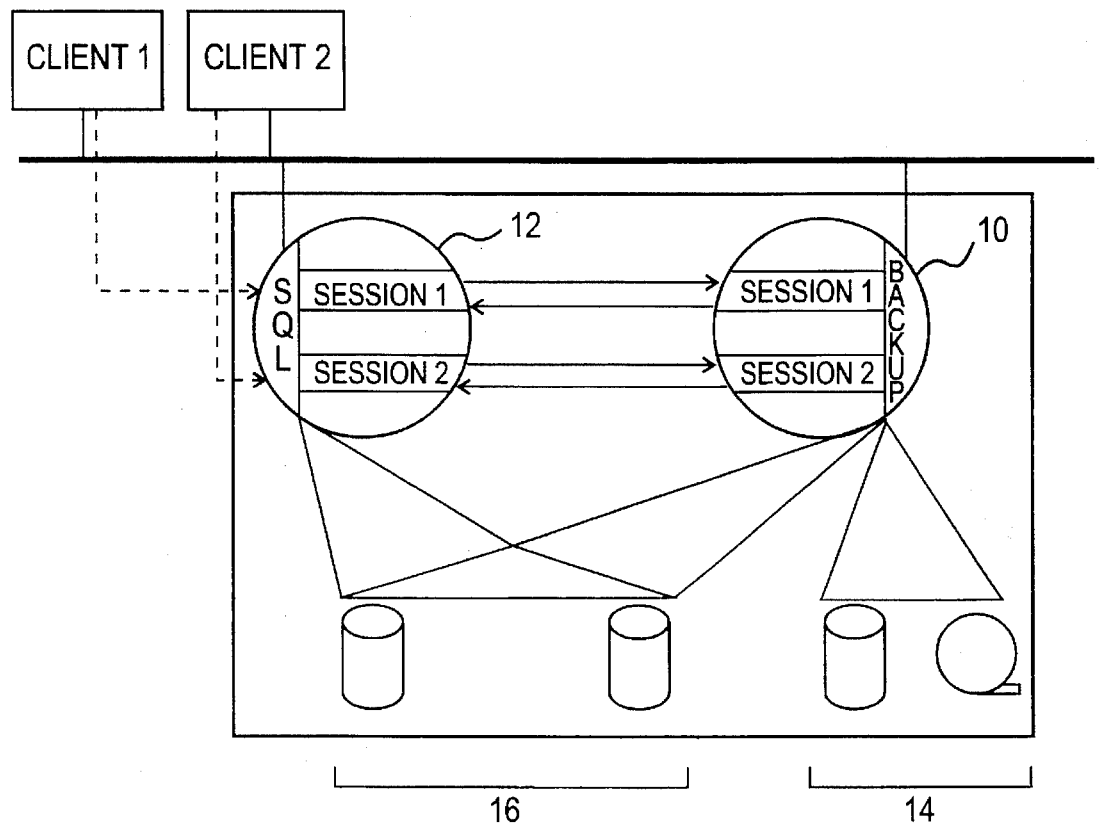
FIG. 1 is an illustration of a typical SQL Server/Backup Server installation made in accordance with the instant invention.

For the purposes of this discussion the following terms will be defined:

An ALLOCATION PAGE is a descriptor within the database or file system which describes a block of PAGES in a database. In one embodiment an ALLOCATION PAGE will contain 32 EXTENT DESCRIPTORS.

An ALLOCATION UNIT is a block of 256 database pages described by an ALLOCATION PAGE. In one embodiment an ALLOCATION UNIT will contain 32 EXTENTS.

An ARCHIVE DEVICE is an I/O device used for making bulk copies of on-line data.

An ASSIGNMENT OF A PAGE is the creation of a mapping of a logical page to a stripe. This mapping occupies an element in a STRIPE DIRECTORY.

A BACKLOGGED DEVICE is a device which has a high number of pending requests for work compared to other devices available for service.

A CURRENT ELEMENT NUMBER is a temporary variable used in determining whether the STRIPE NUMBER for a given logical page has been located. Given the stripe number the invention can refer to the corresponding archive device to which it will write the page.

A DATABASE DISK PIECE is a distinct contiguous interval of database disk blocks. In Sybase® databases, the sysusage table identifies these intervals of disk blocks.

A DIRECTORY ELEMENT is a slot in the STRIPE DIRECTORY that expresses the number of EXTENTS assigned to a single STRIPE for a specific ALLOCATION PAGE.

A DUMP START RID identifies the most recent transaction log record as of the start of the backup session. The invention uses it to establish the start of the region of the transaction log that will contain records for transactions which commit while the backup session proceeds.

An EXTENT is a contiguous interval of disk pages the identifier of whose first page is an integer multiple of the size of the interval. In one embodiment an EXTENT contains 8 PAGES.

An EXTENT COUNT is the number of EXTENTS assigned to a STRIPE.

An EXTENT DESCRIPTOR is an entry contained in an ALLOCATION PAGE which describes an EXTENT within the corresponding ALLOCATION UNIT.

An EXTENT GROUP is an interval of EXTENTS assigned to a STRIPE.

A FREE EXTENT is an EXTENT which is not accounted for as belonging to any object within the database or file system. A FREE EXTENT is available for allocation to an object and filling with new data.

A LOGICAL PAGE is a page which belongs to a Sybase database. Each logical page has a unique integer identifier called a logical page number.

The MAXIMUM STRIPE DENSITY is the smallest number of stripes which must be used when determining the STRIPE AFFINITY for a set of EXTENTS.

A PAGE is a fixed-size, addressable container of data in a computing system. Pages generally begin at locations, or addresses, that are integral multiples of the page size. Generally, to access a page, one gives its number or address to the computing system.

A PAGE TIMESTAMP is a field within a logical page which indicates the time of the last modification to that page.

A PARTIAL EXTENT is a RESERVED EXTENT which contains at least one PAGE available for allocation.

A PHASE is a time interval within a backup session during which only database pages having specific properties may be dumped. Under Sybase® Backup Server software Release 10.0, three phases are defined. These phases elapse within a single session and execute as:

1) dump all allocated database and log pages
2) dump all pages which changed during Phase 1 in a way that cannot be completely reconstructed from transaction log information.
3) dump all log pages that have existed continuously between the beginning of Phase 1 and the end of phase 2.

Phases start when the SQL Server sends an RPC to the Backup Server initiating a phase. Phases end when all of the I/O initiated during the phase has physically been completed.

The PHASE BOUNDARY is the point in time that marks the beginning or end of a PHASE.

PHASE OPTIONS are a list of qualifiers provided to the RPC to indicate that a new phase should begin. PHASE OPTIONS are used by the SQL Server to tell the Backup Server how to perform dump I/O for the phase. One PHASE OPTION is BS_YOUSCAN which tells the Backup Server to read the ALLOCATION PAGES directly from the database, perform STRIPE AFFINITY calculations, generate lists of DATABASE PAGES to dump to their corresponding STRIPES, and finally perform the STRIPE I/O specified in the lists. When all STRIPE I/O from the lists is physically complete, the Backup Server signals completion of the begin-phase RPC to the SQL Server. The SQL Server then sends another RPC to mark the end of that phase. In an non-optimized situation if the SQL Server does not specify BS_YOUSCAN, the Backup Server generates a default set of STRIPE DIRECTORIES, the contents of which do not depend on ALLOCATION PAGE contents. The SQL Server then sends lists of pages for dumping to the Backup Server, instead of the Backup Server generating the lists internally as for BS_YOUSCAN. The SQL Server then sends another RPC to mark the end of that phase.

A REMAINDER STRIPE is the STRIPE to which all EXTENTS unaccounted for in the DIRECTORY ELEMENTS for the ALLOCATION PAGE are to be assigned.

A RESERVED EXTENT is an EXTENT that belongs to some database or file system object.

AN RPC is a Remote Procedure Call which is a service that allows one process to call a software procedure in another process. The processes may be running on separate machines.

The SESSION HANDLER is the process created within the Backup Server in response to a connection from the SQL Server. This process controls the progress of a DUMP or LOAD session.

A STRIPE is an archive device denoted by its position within an ordered set of archive devices in concurrent use. Usage of STRIPES involves writing or reading a collection of PAGES to or from a set of archive devices so that the devices operate concurrently and performance is increased.

STRIPE AFFINITY is a method for ensuring the integrity of database backups made to multiple backup devices simultaneously. Stripe affinity permits reloading backups from fewer devices than used to make the backup.

The STRIPE DENSITY is the number of stripes used to dump a given block of disk pages, such as an ALLOCATION UNIT.

The STRIPE NUMBER is the numeric position of a STRIPE within an ordered set of STRIPES.

The STRIPE DIRECTORY is the data structure that expresses the number of EXTENTS assigned to each of the STRIPES for a specific ALLOCATION PAGE; a collection of DIRECTORY ELEMENTS plus a REMAINDER STRIPE FIELD.

VARIABLE WIDTH DIRECTORY ELEMENTS allow the allocation of smaller stripe directory elements as the number of stripes increases beyond a pre-defined point.

DETAILED DESCRIPTION OF THE PREFERRED EMBODIMENTS

Referring first to FIG. 1, a typical operating environment for a Database Server and Backup Server provided in accordance with the invention is shown. For purposes of this description, it is assumed that the database engine or server is a SQL Server, Release 10.0, such as the type currently available from Sybase Inc. of Emeryville, Calif. However, the architecture of the improved data backup system may be applied to any suitable transactional database or transactional file system which requires the benefits provided by the instant invention.

In the preferred embodiment, the backup system of the invention coordinates the transfer of information between a Backup Server 10 and an SQL Server 12 to produce a recoverable database dump using a special dump synchronization protocol. The dump synchronization protocol may run on a controller (not shown) and control the operation of both the Backup Server and the SQL Server. The controller may also be integrated into the architecture of the Backup Server 10, the SQL Server 12 or both.

Both the Backup Server 10 and the SQL Server 12 have access to database devices 16. In addition, the Backup Server 10 can address multiple archive devices 14.

The dump synchronization protocol ensures recoverability of archived data by organizing the dump operation from the SQL Server 12 to the Backup Server 10 into a set of Phases. In addition, through the use of a number of phase options, the Backup Server 10 is capable of determining the best strategy and order for moving database pages stored on Database Device 16 from the SQL Server 12 to the Backup Server 10 in order to expeditiously and efficiently archive the contents of the database.

Since one of the strategies for increasing the performance of the backup system is to enable unsynchronized database dumps, it is preferable that once a dump is initiated the Backup Server 10 and the SQL Server 12 perform only minimal or no synchronization of access to those database pages on the target database device 16 which are to be backed up. This is advantageous over currently available systems since by providing for such unsynchronized database dumps, the full bandwidth of the available I/O subsystem may be utilized without being locked to SQL Server events.

Referring next to FIG. 2, the basic synchronization scheme used in the database dump of the instant invention is shown. As can be seen, dumps are ordered into phases. In Phase 1, a user initiates a request to dump an image of the database to an archive device. The SQL Server blocks the initiation of any other dumps of the target database 20 and records a dump start RID 22. After recording the dump start RID, the SQL Server signals the Backup Server to begin dumping 24. At this point, the Backup Server begins its dump utilizing the fully available I/O bandwidth. A transaction list is also built at this point including a flush list 28. When this initial Phase 1 dump is completed, the Backup Server signals the SQL Server that Phase 1 of the dump is completed 30 thereby creating a baseline dump of all the pages which will need to be recorded in the backup database.

It should be noted that the backup system of the instant invention is especially well suited to operation in a transactional database environment where it is necessary to update database pages which have already been backed up during some part of Phase 1, but which may have then changed while another part of the Phase 1 backup was in effect. This rewriting of information takes place during Phase 2 during which pages which have been allocated within pending or committed transactions following the time that the dump start RID was received are dumped again. As noted, it is necessary to dump these pages again because an allocation to a transaction tracking log or a page split which takes place during Phase 1, but after the corresponding allocation unit has been dumped, would not otherwise be recoverable. Under the architecture of the instant invention, it is sufficient to re-dump only those pages which have changed, because those pages will contain information created later in time and will therefore overwrite any earlier recorded data with more current data during a restoration session. A useful way to perform this task without limiting the throughput of the SQL Server during Phase 2 is to keep track of all physical changes made to the database which cannot be completely recovered from log information. These are changes which have not yet been committed. These physical changes include, but are not limited to, page splits from B-tree index updates and new pages generated by index creation. During Phase 1, the SQL Server will maintain a list of pages allocated for these purposes, and this list is known as a flush list 28.

As can be seen in FIG. 2, at the beginning of Phase 2, the SQL Server blocks any tasks attempting to add to the flush list before they issue the corresponding log records 32. The preferred order is to (1) log the change; (2) flush the page; and (3) add the page number to the flush list. This is necessary since without such blocking those log records could not be redone. The SQL Server then determines an end point for the flush list and sends it to the Backup Server 34 while awaiting acknowledgement from the Backup Server that pages in the flush list have been dumped. The Backup Server then dumps those pages 36 and returns a completion message to the SQL Server 38 indicating that Phase 2 has been completed.

Turning next to Phase 3, as can be seen in FIG. 2, the SQL Server handles all the log pages which have been allocated since the start of Phase 1. The records all fall between the dump start RID and the current last record of the log. All other allocations and data are recoverable from this log. The SQL Server captures the current last record of the log 40 (called the dump instant) and constructs a list of all log pages between the dump start RID and the dump instant. It ensures that all those pages have been written to the database and then sends a list of log pages to the Backup Server for dumping 46. Finally, the flush list is discarded and deactivated which has the effect of reactivating tasks waiting on the flush list. When the Backup Server signals the end of Phase 3, the SQL Server permits new dumps once again 50.

It is noted that the incorporation of three (3) phases is not critical to the invention, as Phase 2 is necessitated due to the way that the Sybase® SQL Server program (in its current release) performs transactional logging. Rather, at a minimum only Phase 1 (the data phase) and Phase 3 (the log phase) are required. For example, in a transactional data repository system, such as a database or transactional file system, it is only necessary to perform an unsynchronized copy of the repository in Phase 1, followed by a synchronized copy of the transaction log in Phase 3 (which would be the second actual phase in this example). As noted, the function of a later phase is to capture recovery information for all the changes which have occurred during or subsequent to an initial phase but prior to a secondary phase. In the implementation under the Sybase SQL Server Release 10.0, it is necessary to have a Phase 2 for flushed pages due to the particular Sybase design. However this flushed page concept may not exist in other embodiments and, consequently, a data phase and a log phase alone will suffice.

Utilizing the above process, the use of phases provides for recoverable dumps because the phases are designed to guarantee that at a future load time, every page is restored with the most recent image taken before the dump instant. For this guarantee to hold, the Backup Server must enforce the condition such that for any Phase P, where P is greater than 1, and any page p, all images of page p from Phases 1 through P-1 must be loaded before any image from Phase P is loaded. In other words, the system must enforce a condition that data is saved and then reloaded in time sequence order such that later transactions will overwrite earlier transactions, thus maintaining the integrity of the database.

Since it is desirable to use multiple archive devices in order to increase system throughput and thereby reduce backup time, several basic ways of meeting the above noted conditions are possible. The first approach is to ensure that all images of any page p always appear only within the volumes of a single stripe. The second approach is to physically require the loading of all Phases 1 through P-1 before any later Phase P. Finally, the third approach is to keep track of page time stamps, which tell when a page has been created, in memory, in order to prevent overwriting a later image of a page with an older image of the same page.

Analyzing these options it can be seen that the third approach, while functional, is not practical for large databases since large amounts of memory are required to keep track of the numerous page time stamps. For example, a one-terabyte database composed of two-kilobyte pages, each of which contains a four-byte time stamp, would require two gigabytes of main memory to store all the time stamps.

The second approach of physically requiring the loading of all Phases 1 through P-1 before any later Phase P, is also not optimal since in a situation where a set of dump volumes are loaded from fewer archive devices than were used at dump time, it is necessary to change volumes at each Phase boundary on the volumes so that all Phases 1 through P-1 are loaded before any Phase P. As noted, earlier, this is necessary because without such changes, a secondary Phase image of a restored page might be overwritten by a primary phase image from a subsequently loaded stripe volume, thus erroneously backdating that particular page in an unrecoverable manner. While this backdating may be overcome through manipulation by a backup operator, it is too inconvenient to require the user to manage this aspect of Phase ordering while performing backups.

Therefore, it has been determined that option 1 provides an optimal strategy for ensuring that for any Phase P where P is greater than 1 and any page p, all images of page p from Phases 1 through P-1 are loaded before any image from Phase P is loaded. This approach is named stripe affinity and is defined as the property that every image of a page in a database appears on exactly one stripe at dump time. Stated another way, the purpose of stripe affinity is to track the disposition of each page in the database or file system so that if a subsequent request comes in to dump a page (for example, in a later phase), the stripe affinity algorithm can determine on which stripe the page should be dumped. This property removes the volume changing associated with the second approach since all the images of any page follow each other physically, as well as chronologically, on the dump volumes of a stripe and so are automatically restored sequentially, in time order, resulting in the latest version of a page always being restored last. It also addresses the memory usage limitations associated with the third (time stamp) approach illustrated above. In other words, using stripe affinity every image of a page will appear on the same stripe and will always appear sequentially in forward time order. A pseudo code listing of a stripe affinity algorithm which may be used with the instant invention is provided in Appendix A.

Referring to the phases shown in FIG. 2, during a primary phase (or Phase 1) each dumped page is considered for a stripe affinity assignment once and only once. In addition, each dumped page is not seen in any preceding phase because under the invention a database disk piece may only be mapped to a single primary phase. Therefore, under the invention the Backup Server economically remembers the stripe to which a page is dumped by recording this information in a space efficient manner, using as little memory as possible, as well as in a manner which enables the Backup Server to access the information in a time efficient way. In order for this to take place, two primitive operations must be optimized for stripe affinity. These operations are (1) assigning a page seen for the first time to a stripe and remembering that assignment; and (2) determining the assignment of a page which may have been seen and previously assigned in a primary phase.

In order to meet these two goals, the Backup Server must have the ability to spread I/O requests across all database disks in parallel in order to make full use of the available I/O bandwidth. However, it is preferable that the actual assignments of pages to archive devices be limited to a granularity somewhat coarser than individual pages since it is desirable that the memory used to account for stripe assignments be kept small. In other words, it is desirable to store more than one page at a time on a particular stripe in order to reduce memory needed to reference stripe assignments, since the Backup Server is oriented towards backing up large databases. As such large databases grow, the memory needed to track stripe assignments grows as well, so it is important that the growth be controlled in a way that will not tend to exhaust the memory resources of the computing system performing the backup.

In the instant invention, pages are assigned a stripe affinity only during a primary dump phase or Phase 1. The pages may then be dumped in any order, but all the pages from a previous phase must be dumped before any page from the next phase is dumped. A similar rule applies for loads in that the pages in a phase may be loaded in any order, but all the pages from a previous phase must be loaded before any page from the next phase is loaded. Since in the dump sequence pages for later phases may arrive at the Backup Server before that phase has begun, the Backup Server must save these pages and dump them when the proper phase to which they belong begins.

In a preferred embodiment, phases are identified by number and later phases may have higher numbers than earlier phases. Phases are not nested; the previous phase must end before the next phase begins. Additionally, although the invention is described with respect to communications between the SQL Server and a Backup Server, the invention does not require two separate programs. Rather it is only required that some service provider perform the necessary functions. The agent and service provider may be as close as a subroutine call.

As noted earlier, when a dump has been requested, and before the initiation of the first phase, the SQL Server must inform the Backup Server of the pages mapped to each phase by issuing a series of calls to link each phase with those disk pieces from which it will dump pages.

Since these two types of phases, primary (corresponding to Phase 1) and secondary (corresponding to Phases 2 & 3) depend on the phase property bits which are set, in some cases the SQL Server may not send data for a primary phase. Instead, the Backup Server may drive its own transfer of all pages from a device given in a phase map for that phase to the archive device. Then, when the Backup Server has completed the transfer, it will return an acknowledgement for the completion of that phase.

Each secondary phase is bound to a single primary phase. A secondary phase contains run lists from the page mapping of its reference primary phase that refers to those pages which may have already been dumped during that particular primary phase. In other words, the pages identified in a secondary phase are referring to the same page maps as referred to by some of the pages dumped during that primary phase. As noted above, the purpose of a secondary phase is to compensate for those inconsistencies which occur in backing up a transactional database which remains on line while the backup is taking place, by ensuring that the most recent version of each page is present in the dump so that these later versions of pages will be written to the database at load time.

In a preferred embodiment, each phase has properties which determine how pages are read from the database and then handled by the Backup Server. Since pages are assigned a stripe only during a primary dump phase, in one embodiment of the invention, if such a phase specifies that a BSYOUSCAN property is active, it indicates that the Backup Server should read allocation pages directly from the disk pieces specified in the phase map for that phase. Run lists are then constructed reflecting reserved (or written) and free (or empty) extents on the allocation page read in order to pass I/O service tasks for transfer.

In the preferred embodiment, pages are dumped and loaded by logical page number. The Backup Server has to map these logical pages into offsets in the files or devices which contain the database to backed up. This logical/physical mapping is defined by the SQL Server, but carried Out by the Backup Server. This mapping is specified by a series of procedures known as as_db_map.

Each as_db_map procedure defines a disk piece which is a range of logical pages, a file or device name, and the offset in the file or device at which the range begins. The Backup Server then determines the physical location of a page in the database by subtracting the start of the range from the logical page number, adding the offset, and using that as a page number in the device.

Since the logical-to-physical mapping at the time of the dump may not match the mapping at the time of the load, the Backup Server uses the mapping provided by the as_db_map procedure at the time of the load no matter what the mapping was at the time of the dump. There may be any number of disk pieces defined by the database via as_db_map procedures, and the same device may be referenced in more than one as_db_map.

Figure 3A:
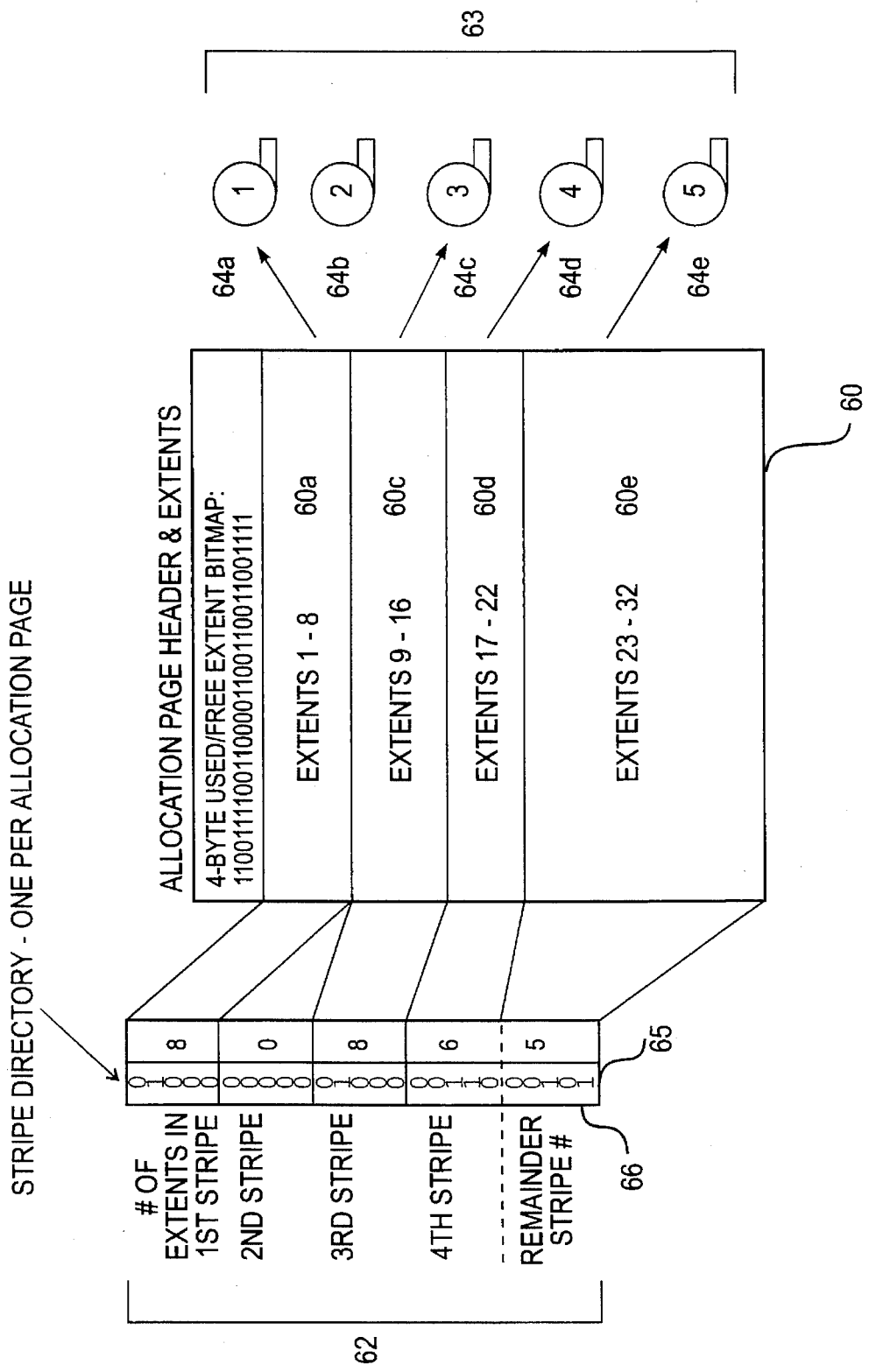
FIG. 3a is an illustration of a stripe directory based on the contents of an allocation page.
Figure 3C:
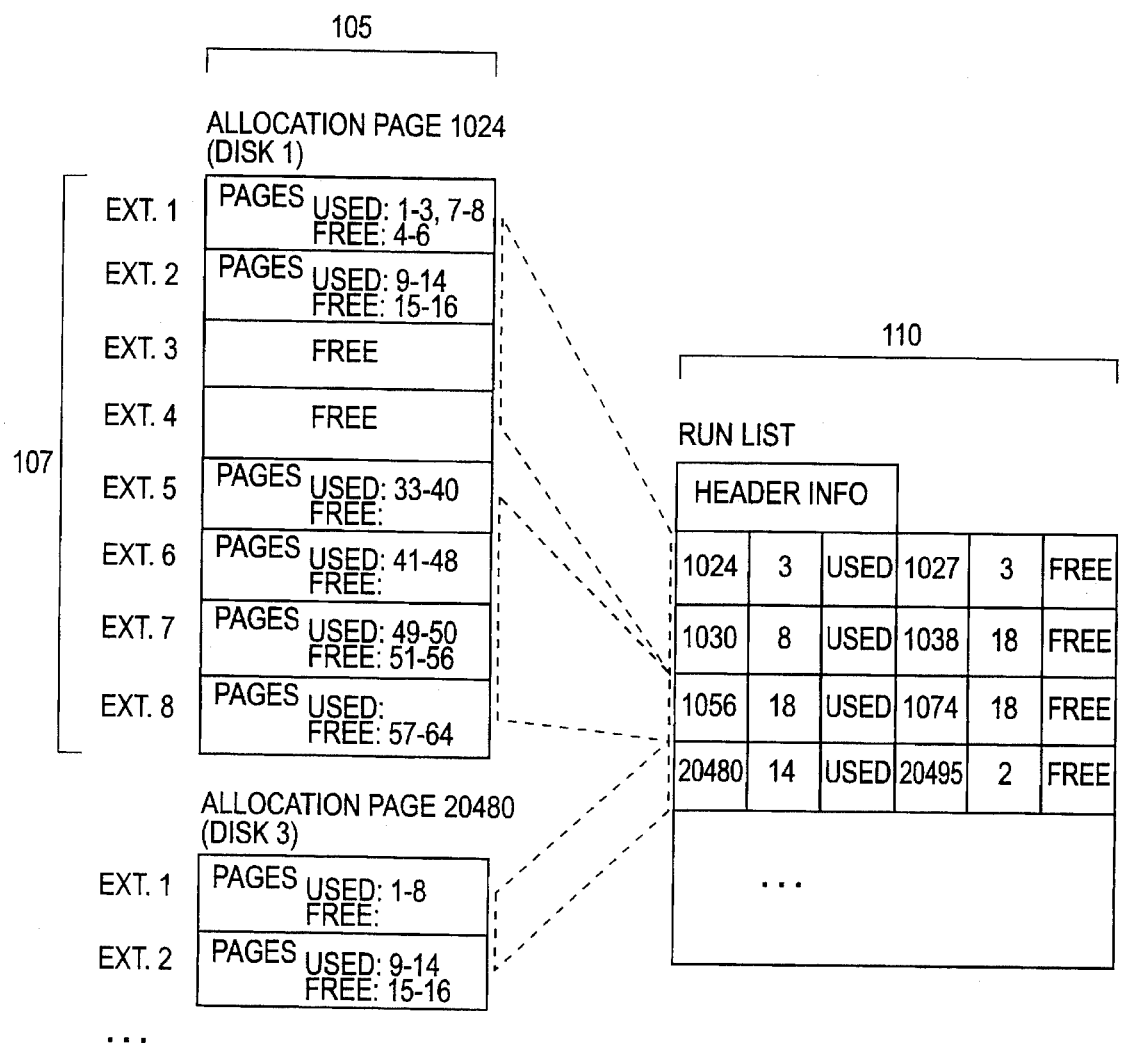

Referring next to FIGS. 3a, 3b and 3c, the determination of stripe assignments for each allocation page is shown.

As illustrated, FIG. 3a shows the construction of a stripe directory based on the contents of an allocation page.

FIG. 3b describes the interface between the Session Handler and the Service Tasks in greater detail. In FIG. 3b, the interface is a queue of Run List structures 70. In operation the Session Handler produces Run Lists 70 as its output and the Service Task 80 takes the Run Lists as its input. FIG. 3b depicts the queue 90, an expression of which disks have entries in the Run Lists in the queue for each stripe, the structure of a Run List 95 and the structure of a Run 100. These structures determine which blocks the Service Task backs up from the database disks to its archive device.

Finally, FIG. 3c illustrates in greater detail the mapping of assigned extents 105 to Run Lists 110. In FIG. 3c the contents of an extent group 107 are represented in a Run List structure 110, showing in particular how runs from multiple database disks can appear in one Run List.

Under the invention stripe assignments are made at the extent level, and no extent ever spans stripes. The use of dump striping allows N archive devices to be used in parallel to create an N-way striped dump. This means that a database may be split logically into N roughly equal sized portions and those portions dumped concurrently to N archive devices. The advantage of this architecture is that it reduces dump time by a factor proportional to N and may, in fact, obviate the need to change physical archive volumes during a backup session since the N archive devices may have enough capacity to hold their corresponding portions of the database on a single device and/or single volume.

For the purposes of the invention the set of devices utilized in a striped dump or load is called the stripe set. In a preferred embodiment, the maximum number of devices in the stripe set is 32. The system labels dump volumes per the ANSI tape labeling standard and each volume of the dump saves the ordinal number of the device in the stripe set as well as the logical volume number in the ANSI volume label. This information is then used at load time and in connection with the change of volumes to verify that volumes are mounted in the same order as they were at dump time so that the database is reconstructed consistently. This scheme also allows any combination of devices to be used at dump or load time and only constrains that volume ordering (that is, the order of media within a particular stripe) be the same at dump and load times. Most importantly, using this scheme it is possible to load from a smaller number of stripe devices than were used at dump time.

As noted above, stripe assignments are determined for each allocation page, accounted for at the extent level, and never permit an extent to span stripes. The mapping of assigned extents 105 to run lists 110 is shown in FIG. 3c. The stripe affinity provided in Appendix A algorithm analyzes the distribution of allocated extents in the allocation unit and assigns groups of extents (both free and reserved) in the allocation unit to individual stripes. In a preferred embodiment, a local 4 byte bit map variable is used to represent the used/free status for each of the 32 extents on any allocation page. This assignment decision attempts to balance the distribution of reserved extents across stripes evenly.

As seen in FIG. 3a, each allocation page has associated with it a stripe directory 60. The stripe directory describes the distribution of extents in an allocation unit 62 to the available stripes 64. The stripe directory is represented as an array of variable width bytes followed by a remainder stripe byte 65. Each byte corresponds positionally to a particular stripe and contains the number of extents which are assigned to that stripe. The extent counts accumulate up to a maximum of 32 since there are a maximum of 32 archive devices 64, and there are an array of such entries for each disk piece that is a part of a primary Phase. To ease the implementation on 8-bit-byte platforms, the stripe directory can be composed of an 8-bit remainder stripe number with 8-bit extent counts for 16 and fewer stripes, and 4-bit extent counts for 17–32 stripes. Under this concept the size of the directory elements does not change the algorithm for creating and accessing a stripe directory. Rather, using 4 or 8-bits simplifies the reading and writing of elements on most computers because a 5-bit value need not be extracted into 8-bits, and vice versa. This extraction work is the cost of using the most compact representation. On the other hand using the less-compact design saves on extraction time but uses more memory.

In the preferred embodiment any extents not counted in the directory elements are then assigned to a remainder stripe 66. The remainder stripe 66 is simply a stripe to which are assigned all the extents not otherwise assigned to any other stripe. The purpose of the remainder stripe is to allow all of the extents in an allocation unit to be assigned to one stripe without requiring that each directory element be able to represent the maximum number of extents on any given allocation page. The remainder stripe field takes the place of the element in the directory because any extents not assigned to any other of the stripes must be assigned to a remaining stripe.

If a directory element contains 0, then no extents are assigned to the corresponding stripe. In this case the stripe affinity algorithm attempts to equalize the number of reserved extents assigned to each stripe, in order to load balance as much as possible. However, every extent, free or not, is assigned in the directory to some stripe. This allows assignment of subsequently allocated extents named in a reconciliation phase (such as Phase 2 or Phase 3) to a stripe without modifying the directory of that extent's allocation page.

Figure 5:
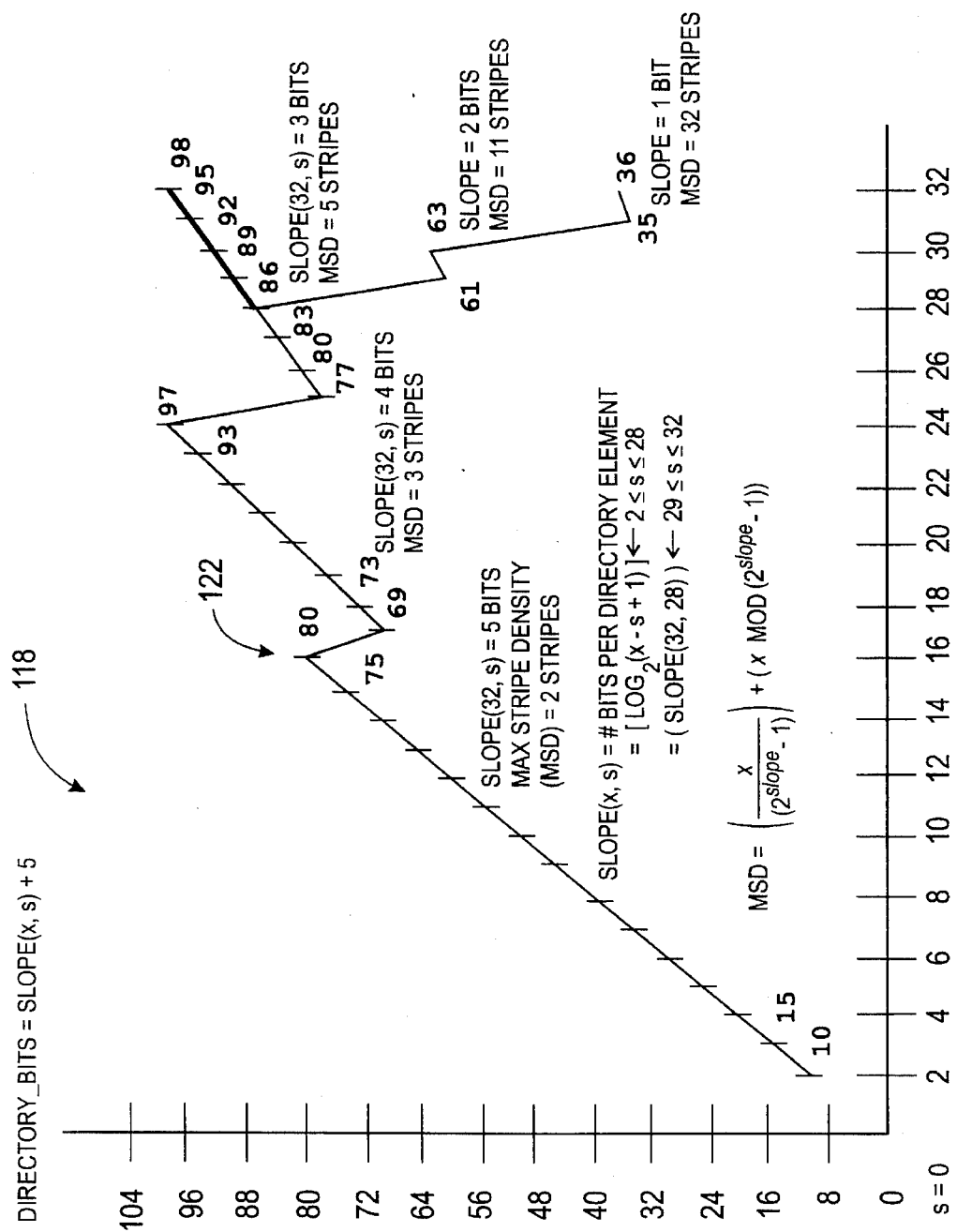
FIG. 5 is a graph illustrating the number of directory bits required to record stripe affinity for up to 32 stripes.

As noted, in a preferred embodiment the elements of the stripe directory are of a variable width with the width of the elements 118 decreasing step-wise as the number of stripes 120 increases. This property is shown in FIG. 5 and allows space and resource savings when representing stripe directories in memory. The decreasing element width reflects the fact that a decreasing number of bits are needed to represent the maximum number of free extents which may lie between reserved extents on an allocation page when at least one reserved extent is written to each stripe. This relationship may be shown by the proof that given a stripe set of size S, with X extents per allocation page, such that S is less than or equal to X, and given that at least one reserved extent is assigned to each stripe, it can be shown that maximum of (X–S+1) reserved or free extents can be assigned to any one stripe by showing that the stripe set is partitioned so that stripes [1,S–1] archive extents [1,S–1]. Stripe S then archives extents [S,X] and there are (X–S+1) extents in [S,X].

In one modification to the invention, the stripe assignment algorithm may be modified to include a factor based upon feedback information from I/O service tasks as a way of adapting the backup process to differences in the data transfer rates supported by the available archive devices.

Using the proof above noted to make an assignment to the stripes shown in FIG. 3a, it can be seen that stripe affinity is based on the I/O backlog which affects stripe 2 (64b) with the result being that stripe 2 (64b) is temporarily not available to archive data. In such a case where we have S stripes, and X extents, and where S=5 and X=32, we can use the equation of the $\log_2$ (x–S+1) is equal to the log base $\log_2$ (32–5+1) which is equal to the $\log_2$ (28) resulting in a stripe directory containing 5 bits per element times 4 stripe fields plus 5 bit remainder stripe field for a total of 25 bits in the stripe directory. This equation is generalized in the chart shown in FIG. 5.

As seen in FIG. 5, generally the greater the number of stripes 120, the greater the number of directory bits 118 which will be necessary. For example, if 5 bits are used to represent the number of extents which may be assigned to one stripe then we can assign 31 extents to one stripe. However, if we have 32 extents on an allocation page, we need to use another stripe to assign the remaining extent. This leads to a calculation known as maximum stripe density (msd), which is the minimum number of stripes which can be used if we make an assignment for every extent (as we must) with a minimum number of extents assigned to the remainder stripe. As shown if the number of stripes grows to 15 (122) then 80 directory bits will be used. Therefore, in an attempt to make the stripe map smaller, it is possible to have a lower maximum stripe density in return for a smaller number of directory bits. In other words, FIG. 5 shows a manner of controlling the growth of the size of the stripe directory to a rate approximately logarithmic in relation to the growth of the number of stripes beyond 16.

As noted above, stripe assignment takes place during the primary phase or Phase 1. In a secondary phase, such as Phase 2 or Phase 3, the SQL Server sends run lists, and logical page number intervals to the Backup Server for archiving. Since this information is an update of information which has previously been stored on the archive devices, the Backup Server must be able to determine quickly the stripes on which the listed pages should be stored. Therefore, a basic optimization of the invention is to calculate stripes only for each whole or partial extent contained in the run list since an extent never spans more than one stripe.

Referring back to FIG. 3a, after fetching the stripe directory 65 for the extents allocation page, the next step is to determine in which stripe (60a–60e) a given extent to be assigned falls. This is done by scanning across the elements of the stripe directory 65, and summing the extent counts from each element. The element for which the accumulated extent count. exceeds the given extent number is the stopping point of the scan. Then, the remainder stripe field 66 is checked against the current element position. If the remainder stripe value is less than or equal to the current element number, then the assignment stripe will be 1+ the current element number, otherwise, the assignment stripe is the current element number. If the element scan reaches the remainder stripe field 66 without the accumulated extent count equaling or exceeding the given extent number, then the extent is assigned to the stripe given in the remainder stripe field 66. For the stripe assignment example given in FIG. 3a, a page on extent 24 (60e) would be assigned to stripe 5 (64e), the remainder stripe, because the sum of the extent counts over the elements for stripes 1 through 4 is less than 24.

As indicated earlier, an object of the invention is to provide maximum concurrency or throughput between database I/O and the available archive devices. To reach this goal it has been determined that:

1. to provide load balancing of archive space usage, the concurrency strategy should attempt to place approximately equal amounts of data on each stripe;

2. to provide load balancing of time usage, (that is to prevent large imbalances of backlogged I/O requests across stripes), the concurrency strategy should utilize feedback so it can avoid sending pages to backlogged devices until the device clears its backlog;

3. to provide database disk concurrency, the concurrency strategy should arrange that as many reads as possible be issued to different database disks at any given instant, rather than reading each database disk sequentially; and 4. to avoid conflicts, archive devices should not "fight" with each other for disk access; that is, two archive devices should not be told to read from widely physically spaced locations on the same disk at the same time. Rather, successive I/O requests should be for blocks at, or a short distance ahead of, the current disk head seek position. In such an embodiment, the database disk arm ideally moves across the platters smoothly (ignoring ordinary database activity.)

The first objective is met through the use of the stripe affinity scheme of the invention because that scheme attempts to divide up allocated extents on an allocation page evenly across stripes. The second objective is met by the communication and assignment of I/O loads away from backlogged devices. Objectives 3 and 4 are met through the use of their own logic design.

Throughout the foregoing the term "Database Disk" or some variant is used. It is noted that these terms may be construed to mean a virtual disk; that is, disk entries for the database stored on a system device. More than one portion of a database can be resident on a virtual disk, and a virtual disk can contain portions of more than one database. In addition, disk pieces for the same virtual disk are grouped together and the disk pieces for a virtual disk then form a single stream of allocation pages. In practice, one stripe affinity directory array will be associated with one disk piece, since disk pieces on a virtual disk can correspond to widely separated intervals of logical pages. This scheme then yields maximum I/O concurrency when virtual disks map to distinct physical spindles with the result that concurrent virtual disk I/O's are physically parallelized.

In actual use it is not practical to guarantee that all the stripe archive devices will each read from a different disk whenever it is possible to do so, because the number of combinations of available disks with available stripes can easily become unmanageable even for small numbers of database disks and archive devices. Instead, a best effort approach is preferred so that during a primary stripe assignment phase, data transfers will be allocated to each archive stripe in sequence so that each stripe will tend to access a different disk from the others at a given instant.

Figure 4A:
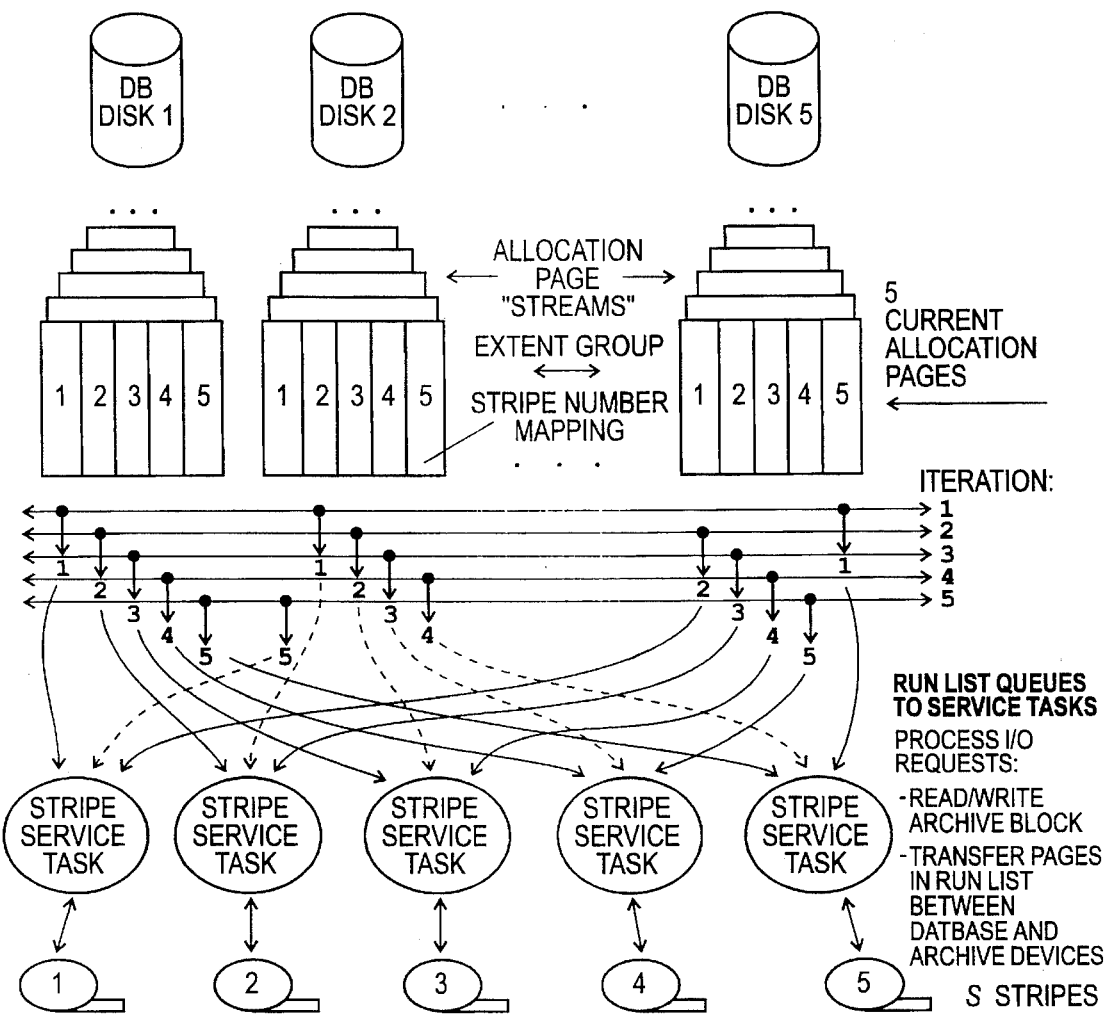
FIG. 4a is an illustration of the allocation of extent groups to stripes when the number of database disks being dumped is greater than or equals the number of stripes.

As seen in FIG. 4a, when there are at least as many disks as stripes, this is a straightforward process. The preferred embodiment follows the scheme depicted below, iterating over the extent groups until all the extents from all the current allocation pages have been sent via run lists to the stripe devices. These iterations are repeated until all the allocation pages from the target disks have been scanned. If there are any remaining disks, the next S disks are selected and the cycle begins again. For example, assuming 5 database disks and 5 stripe archive devices, in a first iteration extent 1 from database disk 1 is written to stripe 1; extent 2 from database disk 2 is written to stripe 2 . . . and extent 5 from database disk 5 is written to extent 5. Then on the second iteration, extent 2 from database disk 1 is written to stripe 2; extent 3 from database disk 2 is written to strip 3; and so on. In this way extent group 1 from every database disk is always written to stripe. 1; extent group 2 from every database disk is always written to stripe 2; etc. This ensures that maximum I/O concurrency can be maintained as the tasks are spread across the available database disks and stripes. It also ensures that extents are always written to the same stripe, which makes certain that data recorded later in time will be written after data recorded earlier in time and further that during restoration data will be provided in a proper time sequence order regardless of the number of archive devices used for restoration.

Figure 4B:
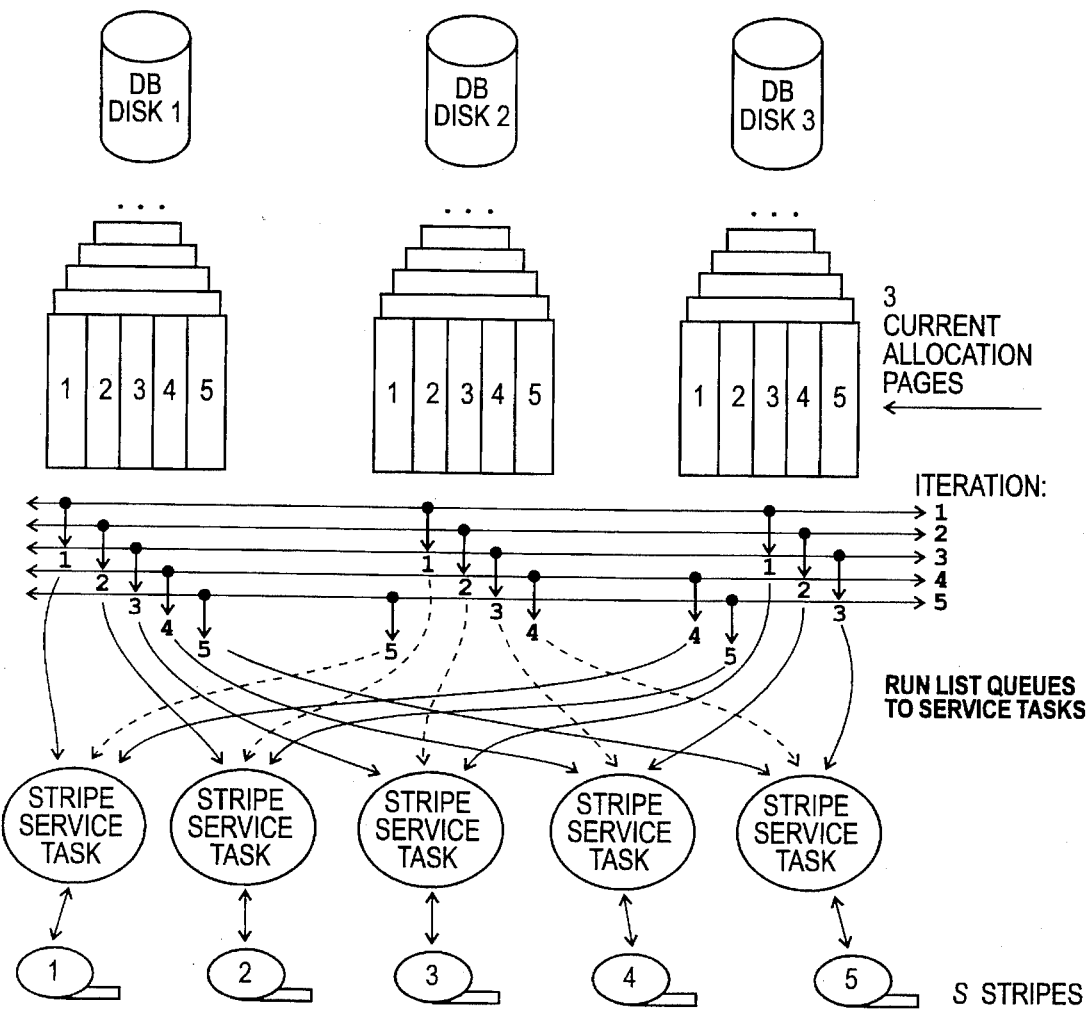
FIG. 4b is an illustration of the allocation of extent groups to stripes when the number of database disks is fewer than the number of stripes.

Referring to FIG. 4b, on the other hand, if there are fewer disks than stripes, either at the beginning or at the end of one or more iterations of the cycle described above, then the allocation scheme will still work as depicted except that database pieces will be passed only to D stripes per iteration (rather than S stripes per iteration). Since the passing of data may proceed much faster than the stripe device I/O, and the algorithm of the invention distributes data to different but mostly overlapping stripes during each iteration, the stripe devices will still tend to have I/O requests to all disks pending at one time. This, in turn, will tend to maximize concurrent disk activity as there will be fewer than the total number of stripes per request at each iteration. In a preferred embodiment, an incorporated task scheduler mechanism is used to allocate processor time among the tasks that comprise the backup system. In this way the I/O service tasks can process their event queues while the invention processes the current set of allocation pages. In general, the Backup Server will be able to sense the type of device that the archival device name represents. This backup logic removes the need for users to pre-specify device types or capabilities. The Backup Server is capable of determining the control method for devices given just the name, and popular supported devices include, but are not limited to, 8 mm tape, DAT, 9 track tape, streaming cartridges, disk files, raw foreign mounted disks, floppy discs or other removable disks as well as all of the preceding devices when accessed via a network.

As touched on above, a desirable effect of using a dump synchronization logic incorporating stripe affinity of the invention is that it simplifies the load logic used during restoration to a nearly trivial level. No phase synchronization is necessary during loading because of the stripe affinity property. Database disk I/O concurrency takes place automatically assuming similar mapping of logical pages to disks at dump and .load times because the dump time logic tends to assign pages from different disks to different stripes. As a result of the calculations performed during dump time, there is little backup specific work to do at load time.

Figure 6:
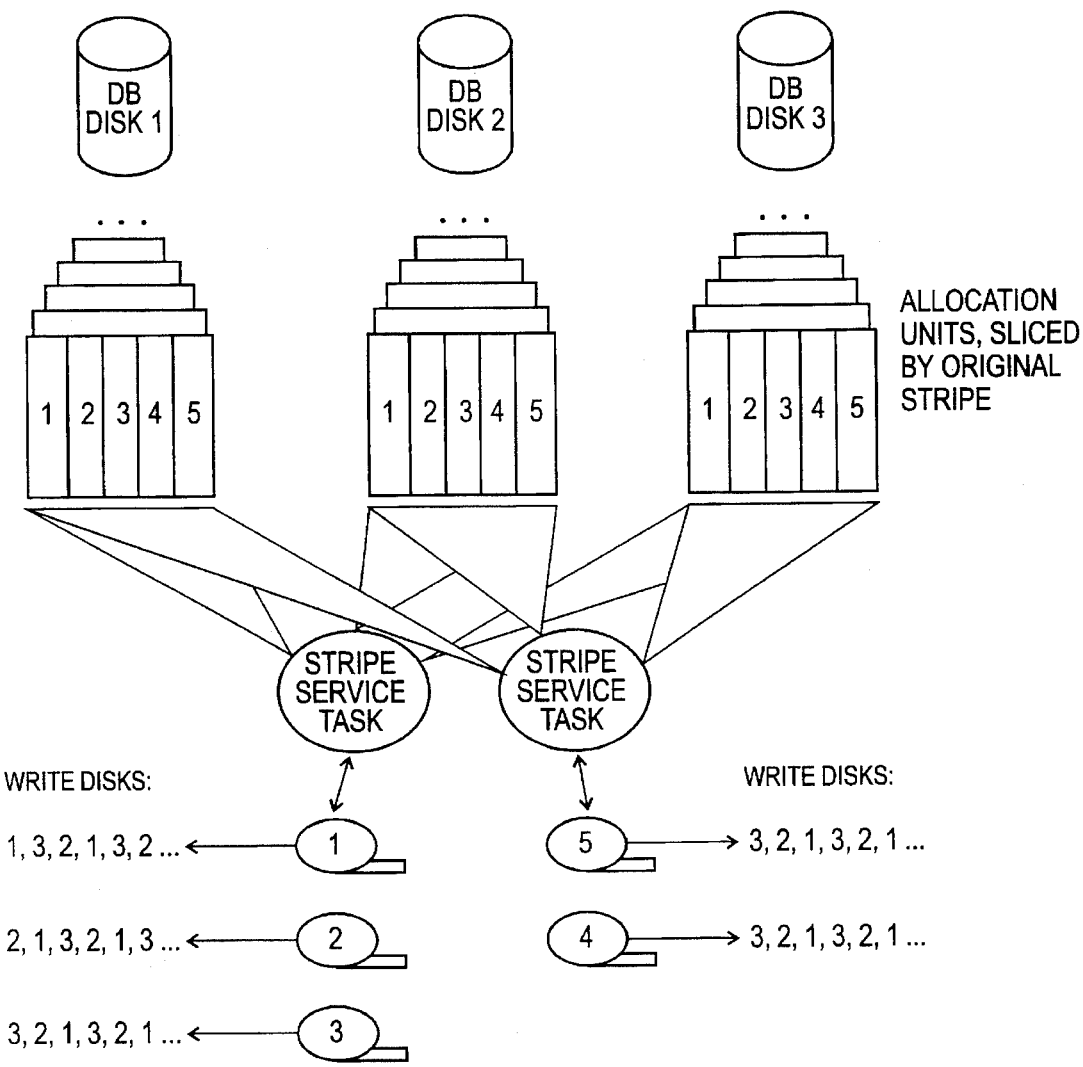
FIG. 6 is an illustration of the restoration of data from fewer archive devices than used during backup, in accordance with the instant invention; and Appendix A. is a Pseudo-Code Listing of A Stripe Affinity Algorithm.

Finally, referring to FIG. 6, an illustration depicting the restoration of data from fewer achieve devices than used to perform a backup is shown. The "Write Disks" sequences show the approximate time sequence of access by each Service Task to the database disks. This restoration follows the backup illustrated in FIG. 4b. For example, stripe 1 will provide extent 1 from disk 1; then extent 1 from disk 3; then extent 1 from disk 2. Concurrently stripe 2 will provide extent 2 from disk 2; and then extent 2 from disk 1; then extent 2 from disk 3; and so on. Using this arrangement, data may be restored with good concurrency (that is, the Service Tasks will tend to access separate disks at each time step), and with fewer restoration archive devices.

In summary, then, through the teaching of the invention an improved data backup system is provided which is especially suited to the backup of information stored in a large transactional database. The backup system is capable of backing up data while the transactional database is still active, and is capable of utilizing multiple backup archive devices to increase the speed at which a backup takes place. Additionally, the information to be backed up is processed through a calculation to determine stripe affinity, a method for ensuring the integrity of the database backups made to multiple backup devices simultaneously, while also permitting the reloading of data from fewer devices than used to make the original backup.

Accordingly, it will be seen that the objects set forth above, among those made apparent from the preceding description, are efficiently attained and, since certain changes may be made in the above constructions without departing from the spirit and scope of the invention, it is intended that all of the matter contained in the above description or shown in the accompanying drawings, shall be interpreted as illustrative, and not as limiting.

It will also be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

Pseudo-Code Representation of Stripe Affinity Algorithm
----------------------------------------------------

Notational conventions:
This file must be printed on 132-column paper (eg. "landscape" mode).

Array elements are considered to number from one.
Datatype and variable declarations are C-like, with
most abbreviations spelled out for clarity.

Major data structures
---------------------

```
/* Database device usage map */
/* STORED ON ARCHIVE MEDIA */
Structure DISK_PIECE
{
    QUEUE      uslink;           /* Queue pointers */
    Character Array usdbname;    /* Database name */
    Integer    uslstart;  /* Starting logical pg */
    Integer    ussize;    /* Size of this piece */
    Integer    usvstart;  /* Starting virtual pg */
    STRIPE_DIR  usstripedir;  /* Stripe-directory information */
}

/* Virtual-page run list (see include/dds.h) */
Structure LOGICAL_RUN
{
    Integer    io_lpn;    /* Logical page number */
    Integer    io_count;  /* Block count */
    Integer    io_stat;   /* Options for the this run of blocks */
}

/* .io_stat symbols */
```

APPENDIX A

```
Pseudo-Code Representation of Stripe Affinity Algorithm
-------------------------------------------------------

Notational conventions:
This file must be printed on 132-column paper (eg. "landscape" mode).

Array elements are considered to number from one.
Datatype and variable declarations are C-like, with
most abbreviations spelled out for clarity.

Major data structures
---------------------

/* Database device usage map */
/* STORED ON ARCHIVE MEDIA */
Structure DISK_PIECE
{
    QUEUE             uslink;       /* Queue pointers */
    Character Array   usdbname;     /* Database name */
    Integer           uslstart;     /* Starting logical pg */
    Integer           ussize;       /* Size of this piece */
    Integer           usvstart;     /* Starting virtual pg */
    STRIPE_DIR        usstripedir;  /* Stripe-directory information */
}

/* Virtual-page run list (see include/dds.h) */
Structure LOGICAL_RUN
{
    Integer   io_lpn;    /* Logical page number */
    Integer   io_count;  /* Block count */
    Integer   io_stat;   /* Options for the this run of blocks */
}

/* .io_stat symbols */
```

APPENDIX A

```
#define LR_ZEROFILL 0x1   /* Zero out the pages in this run at restore time */

/* *** Stripe Affinity Definitions *** */

/*
** Stripe directory structure for one disk piece.
** A STRIPE_DIR contains the stripe affinity assignments,
** eg. a map of what database pages go on what dump stripes,
** for a disk piece. It names the dump phases to which
** the disk piece belongs, so we can tell whether the
** client has sent a run outside the current phase mapping,
** which is an error. STRIPE_DIRs are kept in a queue linked
** to the VIRT_DISK that corresponds to the virtual disk
** on which the pieces reside.
*/
Structure STRIPE_DIR
{
    QUEUE           sd_link;        /* Next/prev STRIPE_DIR for this virtual
                                       disk. */
    DISK_PIECE      *sd_disk_piece; /* Disk piece for this directory */
    Integer         sd_phases;      /* Phases (bitwise) to which this
                                       disk piece belongs */
    Character Array sd_vector;      /* Stripe directory array:
                                       1 directory for each alloc page in
                                       this disk piece.
                                    ** NOTE **
                                    This array is the actual "stripe directory"
                                    that the patent application discusses. This
                                    structure is named STRIPE_DIR to consolidate
                                    the information associated with the array.
                                    */
}
```

```c
/*
** Definition of an extent, page header and allocation page.
** The Backup Server dumps the union of pages contained in
** the ex_alloc and ex_dealloc bitmaps, for compatibility
** with the SQL Server's new algorithm for committing deallocs.
**
** An EXTENT contains 8 pages.
*/
Structure EXTENT
{
    Integer  ex_next;         /* 1st pg of next extent in chain */
    Integer  ex_prev;         /* 1st pg of previous extent in chain */
    Integer  ex_objid;        /* object ID of this extent chain */
    Byte     ex_alloc;        /* bitmap for USED/NOTUSED pg status */
    Byte     ex_dealloc;      /* bitmap for pending-dealloc pg status */
    Byte     ex_stripe;       /* stripe # to which extent assigned */
    Byte     ex_status;       /* extent status */
}

/* Symbol for number of pages per allocation unit */
#define PAGES_PER_ALLOC_UNIT 256

/* Symbol for number of extents per allocation unit */
#define EXTENTS_PER_ALLOC_UNIT 32

/* Symbol for number of pages per extent */
#define PAGES_PER_EXTENT 8

/*
** Allocation page structure.
** An allocation page describes an allocation unit. An allocation
** unit contains 256 pages. An allocation page contains overhead plus
** 32 of the above-defined EXTENT descriptors.
*/
Structure ALLOCATION_PAGE
{
    PAGE_HEADER   ap_pghdr;   /* Overhead, not used */
```

```
        EXTENT       ap_extents[EXTENTS_PER_ALLOC_UNIT];    /* Array of EXTENTs */
}
/*
** stripe directory list header for one virtual disk. An Array of these
** corresponds to the virtual db disks in use by the session. We assi
** our own vdevno's, which index into the VIRT_DISK Array as well as
** into auxtask.at_dbgroup[].
*/
Structure VIRT_DISK
{
    /* The following are working fields for the stripe I/O logic. */
    Integer           vd_current_stripe;    /* Stripe currently receiving runs from
                                               this disk. */
    Integer           vd_current_alloc_page;    /* Current allocation page number */
    STRIPE_DIR        *vd_current_stripe_directory; /* Current stripe directory handle */
    QUEUE             vd_stripedirs; /* STRIPE_DIR list for disk pieces
                                        on this virtual disk. */
    ALLOCATION_PAGE   vd_current_alloc_data;   /* Contents of current allocation page
*/
    Integer           vd_blocks_queued;     /* Count of blocks requested for transfer
                                               in run lists. Adding a run list to queue
                                               increments this field; service task decrements
                                               this field when taking a run list off the
                                               queue. */
};
/* Symbol for an illegal virtual page number */
#define ILLEGAL_VPN -1

/*
** These variables are set at the start of the session, before
** stripe affinity begins execution.
*/
```

```
global Integer Number_of_stripes;          /* Number of archive stripes in backup session */
global Integer Number_of_db_disks;         /* Number of database disks in backup session */
global Integer Bytes_per_directory;        /* Size of the stripe directories for
                                              this session */
        If (Number_of_stripes <= 16)
            Bytes_per_directory =
                (Number_of_stripes - 1) + 1
        Else
            Bytes_per_directory =
                (Number_of_stripes / 2) + 1
        */
global VIRT_DISK Array    Virt_disks;       /* Virtual db disk entries */
global Integer            Current_phase_number;   /* Current or last-completed phase */
global DISK_PIECE Array   Disk_pieces;      /* List of disk region descriptors */

/*
**  GET_STRIPE_ELEMENT
**
**  Procedure to fetch the Ith stripe directory (.sd_vector) element.
**  See patent application, Figures 4A and 5.
**
**  A stripe element is either 8 or 4 bits wide--8 for 16 or fewer stripes,
**  4 for 17-32 stripes.  An 8-bit element is just an ordinary byte.
**  4-bit elements reside two to a byte, with the lower-numbered element
**  in the less-significant nibble of the byte.
**
**  There is one less stripe element in the directory than the number of
**  stripes; this makes an odd number of nibbles for an even number of stripes,
**  so in this case a padding nibble precedes the remainder stripe byte, to
**  allow it and the neighboring directory to reside at a byte rather than
**  nibble boundary.  (For you memory misers, this adds 1MB to the stripe
**  directories for a terabyte database!)  The macro does NOT check bounds,
**  as this is time-critical code.
*/

Procedure GET_STRIPE_ELEMENT(Stripe_dir, Element_number)
```

```
Byte Array     Stripe_dir;
Integer        Element_number;

if (Number_of_stripes <= 16) then              /* Elements are 8-bit extent counts */
    Return stripe_dir[Element_number].
else
    Return ( stripe_dir[ (Element_number + 1) / 2 ]
             Right-shifted (4 *     (Element_number Modulo 2)) )  \
                    Modulo 15.       /* Elements are 4-bit extent counts */
}

/* Macro to fetch remainder element--it's just the last byte of the directory */
#define GET_REMAINDER_ELEMENT(Stripe_dir)                                      \
             ( stripe_dir[Bytes_per_directory] )

/*
**     SET_STRIPE_ELEMENT
**
**     Procedure to set the Ith stripe element.  For 4-bit elements (17 or more
**     stripes), mask the new value into the proper half of the byte (low-half
**     is even index, high-half is odd.)
*/
Procedure SET_STRIPE_ELEMENT(Stripe_dir, Element_number, New)
STRIPE_DIR     Stripe_dir;
Integer        Element_number;
Byte           New_element;
{
    If (Number_of_stripes <= 16) Then
        Set stripe_dir[Element_number] = New_element;
    Else
        Set stripe_dir[ (Element_number + 1) / 2] = (Byte)
          ( stripe_dir[ (Element_number + 1) / 2]
                   Bitwise-and
                   (0xf0 right_shifted (4 * (Element_number Modulo 2))) )
                   Bitwise-or
```

```
        ( (New_element Bitwise-and 0xf)
             left_shifted
             (4 * (Element_number Modulo 2)) )
}

/* Macro to set a remainder element */
#define SET_REMAINDER_ELEMENT(Stripe_dir, New_remainder)
( Stripe_dir[Bytes_per_directory] =(Byte) (New_remainder) )

/*
** MAX_EXTENTS_PER_ELEMENT
**
** Define maximum extents per stripe element.  The maximum stripe
** density (described in the application) describes the minimum number of
** stripes of needed to account for all the extents with a minimum
** number of extents going to the remainder stripe.
*/

Integer
Procedure MAX_EXTENTS_PER_ELEMENT()
{
        if (Number_of_stripes <= 16) Then
             Return (1 Left-shifted 8) - 1.
        else
             Return (1 Left-shifted 4) - 1.
}
```

Case 1 - Internally-Generated Run Lists
-----------------------------------------

The session handler itself scans the allocation pages,
assigns extents to stripes, generates run lists, and
dispatches the run lists to the I/O service tasks
which copy the pages listed in the run lists from
the database or filesystem devices to the archive
devices.

```
/*
**    STRIPE AFFINITY Module
**
**    Routines dedicated to handling stripe affinity assignment.
**    Stripe affinity ensures creation of a recoverable dump by arranging
**    to place all versions of a given database page on the same stripe.
**    This means at LOAD time, the latest version of every page will be
**    written to the database, independent of what order in which the
**    stripes are LOADed.
**
**    History:
**        Mar 92 (tim) - written
*/

/*
**    SCAN_DATABASE_DISKS
**
**    This is the main loop that makes stripe affinity assignments for a
**    set of allocation units mapped in a particular phase (for which we
**    scan the allocation pages ourselves.)
**
**    This reads each allocation page from each disk piece in the phase,
**    assigns each extent in each allocation unit to some stripe, and
```

```
**        builds run lists reflecting the extent assignments for each stripe.
**        It monitors the progress of each stripe in working off the runs
**        it has been given, and avoids sending runs to stripes that have
**        a backlog.
**
**        To effect database disk concurrency, it interleaves the creation of
**        run lists across the database disks, so that runs in the same
**        position in the lists for each stripe tend to refer to different
**        database disks.
**
**        Most of the above functions take place in other routines within this
**        file or within event/rpcutil.c.  This function only runs in BS_YOUSCAN
**        phases.
*/
RETURN_CODE
Procedure scan_database_disks()
{
    int           vdn;
    AUXRETCODE    retcode;
    VIRT_DISK     v_disk;

/*
    ** Get the first allocation page on each disk piece participating
    ** in this scan.
    */
    For (current_disk = each disk to be scanned in this phase)
    {
        /* Set up first piece */
        setup_next_disk_piece(current_disk);

/* Read in the first allocation page */
        Set retcode = read_allocation_page(current_disk).

If (retcode Indicates FAILURE)
            Return retcode;
```

}

/* Scan until we have scanned all disk pieces for this phase */
While (disk_pieces_remain_in_phase() And retcode Indicates SUCCESS)
    Set retcode = scan_allocation_pages().

/* Set up the STRIPE_DIR pointers for the next phase */
Set current_disk = 1.
While (current_disk <= Number_of_db_disks)
{
    Set v_disk = Virt_disks[current_disk].
    Set v_disk.vd_current_stripe_directory = v_disk.vd_stripedirs.

Set current_disk = current_disk + 1.
}

Return (retcode);

}

```
/*
**  DISK_PIECES_REMAIN_IN_PHASE
**
**  Indicate whether there are any "active" disks for this scan
**  of the database.  An "active" disk is one that contains disk pieces
**  (which contain allocation pages and units) mapped to the current dump
**  phase.  The expression to test "active disk" is
**  (Virt_disks[current_disk].vd_current_stripe_directory is not NULL)
**  Return the number of active disks.
*/

Integer
Procedure disk_pieces_remain_in_phase()
{
    Integer active_disks;
    Integer current_disk;

/* Count the number of active disks */
    Set active_disks = 0.
    Set current_disk = 1.
    While (current_disk <= Number_of_db_disks)
    {
        If (Virt_disks[current_disk].vd_current_stripe_directory is not NULL) Then
            Increment active_disks.
    }

Return active_disks.
}
```

```
/*
**     SCAN_ALLOCATION_PAGES
**
**     For each "active" database disk, send the runs for the current allocation
**     unit to the destination stripes.  Having done this, prestage the next
**     allocation page on each disk.  If there are no more allocation units
**     mapped for the current phase on a disk, mark the disk "inactive".
**     For each disk (VIRT_DISK), we track the current disk piece we are scanning
**     by means of the .vd_current_stripe_directory field.  The three states of the
**     VIRT_DISK.vd_current_stripe_directory field are:
**     == &vdsk.vd_stripedirs: STRIPE_DIR queue head--initial state prior
**                             to disk-piece scan for the disk in this DUMP phase.
**     == <some STRIPE_DIR>: STRIPE_DIR for the disk piece we are
**                             currently scanning.
**     == NULL: All the disk pieces on the disk for this DUMP phase have
**             been scanned.
*/
RETURN_CODE
Procedure scan_allocation_pages()
{
    STRIPE_DIR   *cursdir;
    Integer      current_disk;   /* Virtual disk counter */
    Integer      current_arch;   /* Archive stripe counter */
    Integer      active_disks;   /* To match active db disks to
                                    active dump stripes */

VIRT_DISK *v_disk;

/*
    ** We have our current allocation pages.  Find the STRIPE_DIR structure and
    ** compute stripe affinity on each allocation page.
    */
    Set active_disks = 0.
```

```
Set current_disk = 1.
While (current_disk <= Number_of_db_disks)
{
    Set v_disk = Virt_disks[current_disk].

/*
    ** As always, only deal with disks active for
    ** this phase.
    */
    If (v_disk.vd_current_stripe_directory is NULL) Then
        Iterate current_disk and go to top of loop.

/* Count active disk */
    Set active_disks = active_disks + 1.

/* Deal with no more disks than there are archive stripes. */
    If (active_disks > Number_of_stripes) Then
        Jump out of loop.

/* Define affinity assignment for this allocation unit */
    create_stripe_affinity_directory(current_disk, cursdir);

/*
    ** Set up the stripe which will receive a run from this disk,
    ** for the next loop.
    **
    ** The nth active disk is sending 0 or more runs to the nth
    ** stripe.
    */
    Set v_disk.vd_current_stripe = active_disks.

Set current_disk = current_disk + 1.
}

/* Send the run lists from active disks to the stripes */

/*
```

```
**   This loop queues the run lists that reflect the allocation units for
**   which stripe affinity has been assigned.
*/
For (astripe = each archive stripe)
{
    /*
    ** Deliver the runs for each disk's current stripe
    ** from each allocation page.
    */
    Set retcode = send_runs_to_stripe(astripe).

If (retcode Indicates FAILURE) Then
        Return retcode.
}

/*
** Yield use of the CPU from this task to the task
** scheduler here in order to get the I/O service tasks working
** on the new run lists just queued to them. The task scheduler
** resumes running this task by returning from this subroutine.
*/
yield_processor();

/*
** Grab the next allocation pages from the active disks--
** call sta_setupalloc() at end-of-piece.
*/
Set active_disks = 0.
Set current_disk = 1.
While (current_disk <= Number_of_db_disks)
{
    Set v_disk = Virt_disks[current_disk].

/*
    ** As always, only deal with disks active for
    ** this phase.
```

```
    */
    If (v_disk.vd_current_stripe_directory is NULL) Then
    {
        Set current_disk = current_disk + 1.
        Go to top of loop.
    }

/* Count active disk */
    Set active_disks = active_disks + 1.

/* Deal with no more disks than there are archive stripes. */
    If (active_disks > Number_of_stripes) Then
        Jump out of loop.

/* Index next alloc page */
    v_disk.vd_current_alloc_page += PAGES_PER_ALLOC_UNIT;

/* No more in current disk piece? */
    /* Does current allocation page fall beyond the end of the current disk piece for
this disk? */
    If ( v_disk.vd_current_alloc_page >=
        ( v_disk.vd_current_stripe_directory.sd_disk_piece->uslstart +
          v_disk.vd_current_stripe_directory.sd_disk_piece->ussize ) )
    {
        /*
        ** Fetch new piece and first alloc pg,
        ** or mark disk inactive if no more pieces.
        ** If no more pieces, go to next disk.
        */
        fetch_new_disk_piece(current_disk);
    }

/* Fetch next alloc pg */
    Set retcode = fetch_next_allocation_page(current_disk).

If (retcode Indicates FAILURE)
        Return retcode.
```

```
        Set current_disk = current_disk + 1.
    }
    Return SUCCESS.

}
```

```
/*
**      FETCH_NEW_DISK_PIECE
**
**      Find the next piece (STRIPE_DIR) on each virtual that is mapped in this phase.
**      Leave a null pointer in Virt_disks[current_disk].vd_current_stripe_directory
**      when no more pieces.
*/

Procedure fetch_new_disk_piece(current_disk)
Integer  current_disk;
{
    VIRT_DISK *v_disk;

Set v_disk = Virt_disks[current_disk].

/*
    ** Iterate over the STRIPE_DIR list; vd_current_stripe_directory
    ** is set up earlier by device initialization code outside this
    ** module.
    */
    do
    {
        Set  v_disk.vd_current_stripe_directory =
        QUE_NEXT(v_disk.vd_current_stripe_directory).

/* Have we exhausted the list of pieces on this disk
        ** for this phase?
        */
        If (v_disk.vd_current_stripe_directory
             Equals
             v_disk.vd_stripedirs)      /* The start of the STRIPE_DIR
                                        ** list for this disk. */
        {
            /* Mark "no current stripe directory", meaning disk
            ** is inactive in stripe affinity assignment
```

```
        ** for the rest of this phase.
        */
        Set v_disk.vd_current_stripe_directory = NULL.
        Return.
    }
} while ( v_disk.vd_current_stripe_directory is not mapped to Current_phase_number );

/* Save logical page number of allocation pg */
Set v_disk.vd_current_alloc_page =
v_disk.vd_current_stripe_directory.sd_disk_piece->uslstart.

Return.

}
```

```
/*
**    READ_ALLOCATION_PAGE
**
**    Seek on a db disk to the next allocation page and read it in.
**
*/
RETURN_CODE
Procedure read_allocation_page(current_disk)
Integer  current_disk;
{
    Integer     virtual_page_number;

/* Determine the virtual page # of the current logical allocation page number */
    Set virtual_page_number
    = translate_logical_to_virtual(Virt_disks[current_disk].vd_current_alloc_page, NULL).

/* Seek to the allocation page */
    Set retcode = io_seek(current_disk, virtual_page_number * PAGE_SIZE).

If (retcode Indicates SUCCESS)
    {
        /* Start the allocation page read */
        Set retcode
        = io_read(current_disk,
                  Virt_disks[current_disk].vd_current_alloc_data,
                  PAGE_SIZE).
    }

/* If either read or poll failed, post an error */
    If (retcode Indicates FAILURE)
        Report an I/O error.

/* Return status from last operation attempted. */
```

Return retcode.

}

```
/*
**      CREATE_STRIPE_AFFINITY_DIRECTORY
**
**      Given a bitmap of allocated extents in an allocation unit, generate
**      a stripe affinity assignment for the extents.  The premium is on
**      having small differences among the numbers of extents assigned
**      to stripes.  Be sure not to overflow the maximum value of a
**      directory element.  Detect stripes that have long run list queues
**      and avoid sending them new runs on this iteration.
*/
Procedure create_stripe_affinity_directory(current_disk, stripe_dir)
Integer     current_disk;
STRIPE_DIR  *stripe_dir;
{
    Integer     stripe_elem;        /* Value for a stripe element */
    Integer     i;                  /* Generic counter */
    Bitmask     backlog_stripes;    /* Stripes with backlogs have 1 bits in their ordinal
positions */
    Integer     avail_stripe;       /* Number of non-backlogged stripes */
    Integer     element_counter;    /* Stripe dir element iterator */
    Integer     stripe_number;      /* Stripe number for EXTENT on alloc pg */
    Integer     extents_left;       /* Count down unassigned extents */
    Integer     extents_per_stripe; /* Nominal extents assigned per stripe */
    EXTENT      extent;
    Integer     current_alloc_page; /* Current alloc page number */
    Character Array stripe_dir_vector; /* Alloc unit's place in stripe directory array */
    Integer     stripe_dir_number;  /* Dir place number */
    Integer     remainder_stripe;   /* Stripe for remaining extents beyond msd */

/*
    ** Determine stripe backlog, as a bitmap in backlog_stripes,
    ** and the uniform number of extents to assign per non-backlogged stripe.
    */
    Set backlog_stripes = find_backlogged_stripes().   /* Return backlog_stripes and
```

```
avail_stripe values */
Set avail_stripe = the number of 0 bits in backlog_stripes.
Set extents_per_stripe = EXTENTS_PER_ALLOC_UNIT / avail_stripe.

/* Determine directory number */
Set current_alloc_page = Virt_disks[current_disk].vd_current_alloc_page.
Set stripe_dir_number = (current_alloc_page - stripe_dir.sd_dbusage->uslstart)  /
PAGES_PER_ALLOC_UNIT.

/* Find start of directory */
Set  stripe_dir_vector  =  stripe_dir.sd_vector  +  (Bytes_per_directory *
stripe_dir_number).

/*
** Choose rotating remainder stripe, for load balancing,
** but avoid using a backlogged stripe.  Find backlogged_stripes()
** guarantees at least one non-backlogged stripe.
*/
Set   remainder_stripe   =   (Virt_disks[current_disk].vd_current_alloc_page /
PAGES_PER_ALLOC_UNIT) Modulo Number_of_stripes.

/* Increment remainder stripe until one not backlogged is found */
While ( (backlog_stripes Bitwise-and (1 Left-shifted remainder_stripe)) Is Not 0 )
    Set remainder_stripe = (remainder_stripe + 1) Modulo Number_of_stripes.

SET_REMAINDER_ELEMENT(stripe_dir_vector, remainder_stripe);

/*
** Now for each non-backlogged stripe, try to assign extents_per_stripe
** extents to it.  Decrement and put remainder where it belongs.
*/
Set extent = the first extent on the current allocation page
    (Virt_disks[current_disk].vd_current_alloc_data.ap_extents[ 1 ]).
Set extents_left = EXTENTS_PER_ALLOC_UNIT.
```

```
/* MAX_EXTENTS_PER_ELEMENT() enforces the maximum stripe density figure */
Set stripe_elem = MIN(MAX_EXTENTS_PER_ELEMENT(), extents_per_stripe).

Set element_counter = 0.
While (element_counter < Number_of_stripes)
{
    /* Adjust stripe number saved in allocation page copy */
    If (element_counter >= remainder_stripe)
    {
        Set stripe_number = element_counter + 1.

/* If true, this pass applies to stripe after rmdr */
        If (element_counter == remainder_stripe)
            Set backlog_stripes = backlog_stripes Right-shifted 1.
    }
    Else
        Set stripe_number = element_counter.

/* Assign no extents to a backlogged stripe */
    If ( (backlog_stripes Bitwise-and 1) Is Not 0 )
    {
        SET_STRIPE_ELEMENT(stripe_dir_vector, element_counter, 0);
        Set element_counter = element_counter + 1.
        Go to top of loop.
    }

/* Set the stripe assignment in the EXTENTs */
    Set i = 0.
    While (i < stripe_elem)
    {
        Set extent.ex_stripe = stripe_number.
        Set extent to next extent in Array.

Set i = i + 1.
    }
}
```

```
SET_STRIPE_ELEMENT(stripe_dir_vector, element_counter, stripe_elem);

Set extents_left = extents_left - stripe_elem.
    Set backlog_stripes = backlog_stripes Right-shifted 1.

Set element_counter = element_counter + 1.

}
/*
** Nonzero extents_left means the backlog leaves less than the minimum
** stripe density of drives available, so dump rest of extents
** on a remainder stripe that rotates among the stripes once for each
** allocation page.
*/
While (extents_left Is Not 0)
{
    Set extent.ex_stripe = remainder_stripe.
    Set extent to next extent in Array.

Set extents_left = extents_left - 1.

}

Return;

}
```

```
/*
**      FIND_BACKLOGGED_STRIPES
**
**      Compute a bit vector of backlogged archive stripes.
*/

/*
**      Percentage above aggregated input queue length over which a stripe
**      service task is considered backlogged.  This is a tunable
**      parameter.
*/
#define BACKLOG_PERCENT 50

Integer
Procedure find_backlogged_stripes()
{
    Integer     blocks_queued[MAXSTRIPE];       /* Stripe queued-block counts */
    Integer     median_blkct;                   /* Median queued-block count */
    bitmask     backlog_stripes;                /* Bitmask of backlogged stripes */
    Integer     i;                              /* Counter */

/*
    ** First, collect the counts of blocks waiting for I/O on the stripes.
    */
    Set i = 0.
    While (i < Number_of_stripes)
    {
        Set blocks_queued[ i] = Virt_disks[ i] .vd_blocks_queued.

Set i = i + 1.
    }

/* Now sort the counts, so we can find the median value */

/* Aside: using the mean may provide better throughput.
```

Using the mean will tend to backlog fewer stripes because
backlog values are practically unbounded, tending to raise the
average, so fewer stripes will have values above the avg than
above the median. This is tunable logic.
*/
sort_array(blocks_queued).

/* The median value is about midpoint in the Array */
median_blkct = blocks_queued[ (Number_of_stripes + 1) / 2];

/* Find how many stripes have block counts that exceed the median
** of all the block counts by at least BACKLOG_PERCENT.
*/

/* Aside: BACKLOG_PERCENT could instead be a multiple of standard
** deviations rather than of the median.
*/
Set backlog_stripes = 0.
Set i = 0.
While (i < Number_of_stripes)
{
    /* Compare each disk's queued block count to percentage delta over media block count */
    if ( Virt_disks[i].vd_blocks_queued > ((100 + BACKLOG_PERCENT) * median_blkct) / 100 )
    {
        /* Block count exceeds metric; mark stripe as backlogged */
        Set backlog_stripes = backlog_stripes Bitwise-or (1 Left-shifted i).
    }
    Set i = i + 1.
}
Return backlog_stripes.
}

```
/*
**      SEND_RUNS_TO_STRIPE
**
**      Each of the currently active db disks has a current allocation
**      unit, and a set of stripes to which runs from that allocation unit are
**      to be sent.  This routine sends the runs to those stripes.
**
**      Make sure not to submit I/O from more database disks than there are dump
**      stripes.  For concurrency, we want to send runs to a different stripe on
**      each pass of the database disk loop.
**
*/
RETURN_CODE
Procedure send_runs_to_stripe()
{
    VIRT_DISK    v_disk;          /* Virtual disk handle */
    STRIPE_DIR   cursdir;         /* Stripe directory handle */
    Integer      current_disk;    /* Virt disk counter */
    Integer      run_page_counter; /* Count pages for a run */
    Integer      active_disks;    /* Active db disk counter */
    EXTENT Array extent_tab;      /* Start of EXTENT table on allocation page */
    Integer      current_extent;  /* Counter */
    LP_RUN       stripe_run;      /* Run to send to a stripe */
    BYTE         ex_alloc;        /* Page allocation map on EXTENT */
    AUXRETCODE   retcode;

/* Loop through the db disks, sending the runs for each stripe */
    retcode = AUXSUCCESS;
    Set active_disks = 0.
    Set current_disk = 1.
    While (current_disk <= Number_of_db_disks)
    {
        Set v_disk = Virt_disks[current_disk].

/*
```

```
**        As always, only deal with disks active for
**        this phase.
*/
If (v_disk.vd_current_stripe_directory is NULL) Then
{
        Set current_disk = current_disk + 1.
        Go to top of loop.
}

Set cursdir = v_disk.vd_current_stripe_directory.

/*
**      Send the runs destined for the current stripe.
**      To support LOAD-time page zeroing, we need to
**      separate out allocated and free pages into
**      separate runs.  Runs that indicate zero-filling
**      of pages have a 1 bit in their status fields
**      indicating this.
*/

/* Find beginning of the EXTENTs on the alloc page; use
** extent_tab as another name for the array of EXTENTs.
*/
Set extent_tab = the start of the v_disk.vd_current_alloc_data.ap_extents Array.

/* Find the first extent to backup to our stripe */
Set current_extent = 1.
Set extent = extent_tab[current_extent].
While  (extent_tab[current_extent].ex_stripe    Does    Not    Equal
v_disk.vd_current_stripe)
{
        Set current_extent = current_extent + 1.

Set extent = extent_tab[current_extent].
}

/*
```

```
** Get used/free bitmap of pages in the extent.
** A non-zero object id tells us to read the extent.ex_alloc
** and extent.ex_dealloc bitmaps.  The Bitwise-or of those maps
** tells us the pages to back up.  A zero object id, meaning the extent
** does not currently contain valid data, tells us to
** define a bitmap of 0, except for the extent
** containing the allocation page.  For this extent, we
** set ex_alloc to 1 to effect backup of the allocation
** page itself.
*/
If (extent_tab[current_extent].ex_objid is not 0) Then
    Set   ex_alloc   =   (extent_tab[current_extent].ex_alloc   Bitwise-or
extent_tab[current_extent].ex_dealloc).
Else
{
    If (current_extent equals 1)
        Set ex_alloc = 1.
    Else
        Set ex_alloc = 0.
}

/* Set starting page of run, starting count and initial status */
Set stripe_run.io_lpn = v_disk.vd_current_alloc_page + ((current_extent - 1) *
PAGES_PER_EXTENT).
Set stripe_run.io_count = 0.
If ( (ex_alloc Bitwise-and 1) Does Not Equal 0)
    Set stripe_run.io_runstat = 0.
Else
    Set stripe_run.io_runstat = LR_ZEROFILL.

/*
** Find all extents in our stripe and send their
** pages in coalesced runs to the stripe.
*/
While (current_extent <= EXTENTS_PER_ALLOC_UNIT
And    extent_tab[current_extent].ex_stripe Equals v_disk.vd_current_stripe)
{
```

```
/* Accumulate like-type pages together; 8 bits per byte */
Set run_page_counter = 0.
While (run_page_counter < 8)
{
    /*
    ** Catch change in page sequence from free to reserved or reserved to
    free.
    */
    If (((ex_alloc Bitwise-and 1) Equals 1
        And (stripe_run.io_runstat Bitwise-and LR_ZEROFILL) Equals 1)
        Or ((ex_alloc Bitwise-and 1) Equals 0
        And (stripe_run.io_runstat Bitwise-and LR_ZEROFILL) Equals 0))
    {
        Set retcode = queue_run(stripe_run, cursdir).
        If (retcode Indicates FAILURE)
            Return retcode.

/*
        ** Set up the next run of pages
        ** from this allocation unit.
        */
        Set stripe_run.io_lpn
            = v_disk.vd_current_alloc_page
            + ((current_extent - 1) * PAGES_PER_EXTENT).
        Set stripe_run.io_count = 0.

/* Carry over current run status */
        If ((ex_alloc Bitwise-and 1) Equals 1)
            Set stripe_run.io_runstat = 0.
        Else
            Set stripe_run.io_runstat = LR_ZEROFILL.

/* Increment page count */
        Set stripe_run.io_lpn = stripe_run.io_lpn + run_page_counter.
    }
```

```
        /* Keep accumulating into current run */
        Set stripe_run.io_count = stripe_run.io_count + 1.

Set ex_alloc = ex_alloc Right-shifted 1.

Set run_page_counter = run_page_counter + 1.
        }

Set current_extent = current_extent + 1.

/*
        ** Use the simple object id check, since we can't now
        ** be on the allocation page's extent.
        */
        If (extent_tab[current_extent].ex_objid is not 0)
            Set ex_alloc = (extent.ex_alloc Bitwise-or extent.ex_dealloc).
        Else
            Set ex_alloc = 0.

}

/* Send the last run we built, if any */
    If (stripe_run.io_count Does Not Equal 0)
    {
        Set retcode = queue_run(stripe_run, cursdir).
        If (retcode Indicates FAILURE)
            Return retcode.
    }

/* Increment the disk's destination stripe, Modulo # of stripes */
    Set  v_disk.vd_current_stripe  =  (v_disk.vd_current_stripe + 1) Modulo Number_of_stripes.
}

Return (retcode).
}
```

This page left intentionally blank.

Case 2 - Externally-Generated Run Lists

The session handler receives run lists from the session requester. Since the session handler does not scan allocation pages itself to generate the stripe directories and resultant run lists, it must define default stripe directories for the purpose of routing the pages in the received run lists to the correct archives.

```
/*
** STA_INITSTADIRS
**
** For all the disk pieces in the given phase, init the stripe affinity
** directories to a uniform distribution.  Make the remainder stripe
** number rotate among all the stripes so that adjacent alloc units
** use different remainder stripes.  This is used when the SQL Server
** sends us runs for a phase, so we can't discover the actual layout
** of reserved extents ourselves.
*/

Procedure assign_uniform_stripe_affinity (phase_number)
Integer   phase_number;
{
    Integer       dir_ctr;          /* stripe dir counter */
    DISK_PIECE    dp;
    STRIPE_DIR    stripe_dir;
    Integer       remainder_stripe;  /* For remainder stripe rotation */

/* Scan the DISK_PIECEs to find which belong to our phase */
    For (each DISK_PIECE dp in Disk_pieces)
    {
        Set stripe_dir = dp.usstripedir.

If ( (stripe_dir.sd_phases Bitwise-and (1 << phase_no)) Equals 0 ) Then
```

```
    Iterate dp, go to top of loop.

/* Got a DISK_PIECE mapped in our phase--set up the dirs */
Set remainder_stripe = 0.
Set dirctr = 0.
While (dir_ctr < (dp.ussize / PAGES_PER_ALLOC_UNIT))
{
    /* Initialize current directory */
    sta_dirinit(dir_ctr, remainder_stripe, stripe_dir);

/* Rotate remainder stripe */
    Set remainder_stripe = (remainder_stripe + 1) Modulo Number_of_stripes.

Set dir_ctr = dir_ctr + 1.
}
```

```
/*
**      MAKE_UNIFORM_STRIPE_DIRECTORY
**
**      Initialize a stripe directory with a "uniform" distribution, that is,
**      one that specifies an equal number of extents in the allocation unit
**      to go to each stripe.  This equal number is always (EXTENTS_PER_ALLOC_UNIT /
**      Number_of_stripes), regardless of the actual number of allocated extents
**      in the allocation unit or stripe backlogs.
*/
Procedure make_uniform_stripe_directory(directory_number, remainder_stripe, stripe_dir)
Integer     directory_number;
Integer     remainder_stripe;
STRIPE_DIR  *stripe_dir;
(
    Character Array sta_dir;  /* stripe directory itself */
    Integer   element_counter;      /* Stripe element counter within dir */
    Integer   extents_per_stripe;   /* extents per non-remainder stripe */

/*
    ** Set each stripe element to an (approximately) equal number
    ** of extents.
    */
    Set extents_per_stripe = MIN( MAX_EXTENTS_PER_ELEMENT(),
                        (EXTENTS_PER_ALLOC_UNIT / Number_of_stripes) ).

/* Get directory */
    Set sta_dir = stripe_dir.sd_vector + (Bytes_per_directory * directory_number).

/*
    ** Set each stripe to get a roughly equal portion of
    ** the extents.
    */
    Set element_counter = 1.
    While (element_counter < Number_of_stripes)
```

```
        SET_STRIPE_ELEMENT(sta_dir, element_counter, extents_per_stripe);
        Set_element_counter = element_counter + 1.
    }

SET_REMAINDER_ELEMENT(sta_dir, remainder_stripe);

}
```

```
/*
**  Routines dedicated to handling stripe affinity lookup.  Given
**  a page number, determine on which stripe to put it.
**
**  Stripe affinity ensures creation of a recoverable dump by arranging
**  to place all versions of a given database page on the same stripe.
**  This means at LOAD time, the latest version of every page will be
**  written to the database, independent of what order in which the
**  stripes are LOADed.
*/
```

```
/*
**    LOOKUP_STRIPE_AFFINITY
**
**    Given a logical page number and a STRIPE_DIR, return the stripe
**    assignment of the extent that contains that logical page.
*/
Integer
Procedure lookup_stripe_affinity(page_number, stripe_dir, extents_left_for_stripe)
Integer       page_number;
STRIPE_DIR    *stripe_dir;
Integer output extents_left_for_stripe; /* Output the number of extents following the
one that contains page_number
                    that reside on the same stripe. */
{
    Integer   sta_dirno;        /* Stripe affinity directory number in directory array */
    Character Array sta_dir;    /* Stripe affinity directory */
    Integer   extent_count;
    Integer   total_extents;    /* Accumulate extent counts per stripe */
    Integer   page_extent_number; /* Extent number of page number */
    Integer   stripe_assignment; /* Stripe to which page has affinity */

/*
    ** Determine directory number--we know that the .uslstart
    ** is an allocation page (ie, its page number % PAGES_PER_ALLOC_UNIT == 0.)
    */
    Set sta_dirno = (page_number - stripe_dir.sd_dbusage->uslstart) / PAGES_PER_ALLOC_UNIT.

/* Find start of directory */
    Set sta_dir = stripe_dir.sd_vector + (Bytes_per_directory * sta_dirno).

/* Find the extent number in the allocation unit */
    Set page_extent_number = (page_number Modulo PAGES_PER_ALLOC_UNIT) / PAGES_PER_EXTENT.

/*
```

```
**      Sum up each element in directory up to #-of-stripes minus 1.
**      If the sum exceeds the number of the extent on which
**      the page resides, break the loop.  If we exit on the branch
**      condition, the page is on the remainder stripe.
*/
Set extent_count = 1.
Set total_extents = 0.
While (extent_count < Number_of_stripes)
{
        Set total_extents = total_extents + GET_STRIPE_ELEMENT(sta_dir, extent_count).

/* Found our element? */
        If (total_extents > page_extent_number)
                Jump out of loop.

Set extent_count = extent_count + 1.
}

/* See if we fall into the remainder stripe */
If (extent_count == Number_of_stripes)
{
        Set stripe_assignment = GET_REMAINDER_ELEMENT(sta_dir).

/* Remainder stripe is last, so rest of extents are on it */
        Set extents_left_for_stripe = (EXTENTS_PER_ALLOC_UNIT) - (page_extent_number + 1).
        Return stripe_assignment.
}

/* See if we passed the remainder stripe while scanning */
If (extent_count >= GET_REMAINDER_ELEMENT(sta_dir))
{
        Set stripe_assignment = 1 + extent_count.

/* Return extents remaining in the stripe */
        Set extents_left_for_stripe = total_extents - (page_extent_number + 1).
```

What is claimed is:

1. In a computer system comprising a database server connected to a plurality of storage devices and a plurality of archive devices, said database server providing an on-line database comprising a plurality of data records, each storage device storing particular ones of said data records as a plurality of data pages on a storage media, said database server processing in real-time transactions which modify content of some of said data records, a method for transferring a copy of said on-line database stored on said storage devices to said archive devices, the method comprising:

(a) for each storage device, grouping data pages for the storage device into a sequence of extent groups, each extent group comprising some of the data pages for the storage device;

(b) for each storage device, associating each extent group of the storage device with a particular archive device, so that corresponding extent groups from said storage devices are transferred to a single archive device;

(c) concurrently for each storage device and while continuing to process transactions in real-time which modify content of some of said data records, transferring a copy of all said data records stored on the storage devices to said archive devices by copying successive extent groups from said each storage device to an associated archive device regardless of whether a particular data record is subject to modification by a transaction which has not completed processing by:
  (i) for each archive device, transferring to the archive device an extent group from said corresponding extent groups for the archive device, and
  (ii) repeating step (c)(i) for other extent groups until each archive device stores all corresponding extent groups from said storage devices;

(d) storing information describing which of said data records were subject to modification by a transaction which has not completed processing during step (c); and (e) based on said information stored in step (d), transferring to said archive devices a copy of said data records stored on the storage devices which were subject to modification by a transaction which has not completed processing during step (c).

2. The method of claim 1, wherein step (a) includes:

for each storage device, grouping data pages for the storage device into a sequence of extent groups, each extent group comprising contiguous data pages for the storage device, said grouping step being performed so that all storage devices have an identical number of extent groups.

3. The method of claim 1, wherein step (a) includes:

for each storage device, grouping data pages for the storage device into a sequence of extent groups, each extent group comprising contiguous data pages for the storage device, said grouping step being performed so that each storage device has a number of extent groups equal to how many archive devices are present in the system.

4. The method of claim 1, wherein step (b) includes:

for each extent group, assigning the extent group within a sequence of extent groups a number identifying the extent group in said sequence of extent groups;

for each archive device, assigning the archive device a number identifying the archive device among said plurality of archive devices; and for each extent group of each storage device, associating the extent group with a particular archive device based on the number of the extent group and the number of the archive device.

5. The method of claim 4, wherein step (b) includes:

for each extent group of each storage device, associating said each extent group with an archive device having a number equal to the number of said each extent group.

6. The method of claim 1, wherein each data page stores a plurality of data records for a database table.

7. The method of claim 1, wherein each extent group comprises data pages which are stored in a contiguous region on a particular storage device.

8. The method of claim 1, wherein the number of said plurality of storage devices is equal to or greater than the number of said plurality of archive devices present in the system.

9. The method of claim 1, wherein a first one of said archive devices stores the first extent group for each of said storage devices upon completion of the method.

10. The method of claim 1, wherein n number of archive devices are present in the system and wherein the nth archive device stores the nth extent group for each of said storage devices.

11. The method of claim 1, wherein n number of archive devices are present in the system, wherein a first one of said archive devices stores the first extent group for each of said storage devices, wherein a second one of said archive devices stores the second extent group for each of said storage devices, and wherein an nth one of said archive devices stores the nth extent group for each of said storage devices.

12. The method of claim 1, wherein step (c) includes:

concurrently copying data records from all said extent groups to said archive devices regardless of whether a particular data record is subject to modification by a transaction which has not completed processing, so that each extent group is copied to a particular one of said plurality of archive devices.

13. The method of claim 1, wherein said on-line database comprises a database table stored on a plurality of storage devices, wherein step (a) includes:

logically grouping data records of the on-line database stored on each storage device into a plurality of extent groups, said grouping step being performed so that at least one extent group is created on each storage device for each of said archive devices present in the system; and wherein step (c) includes concurrently copying from all said storage devices extent groups of said data records to said archive devices regardless of whether a particular data record is subject to modification by a transaction which has not completed processing, so that each archive device stores corresponding extent groups copied from different ones of said plurality of archive devices.

14. The method of claim 13, wherein said extent groups are substantially equal in size.

15. The method of claim 13, wherein each of said extent groups comprises data records of said on-line database which are stored contiguously in said database server.

16. The method of claim 1, wherein each said groups comprise a substantially equal number of data pages.

17. The method of claim 1, wherein said system includes n number of archive devices and wherein step (a) includes:

for each storage device, dividing data pages stored on said each storage device into n number of extent groups.

* * * * *